(12) United States Patent
Muraishi

(10) Patent No.: US 9,183,434 B2
(45) Date of Patent: Nov. 10, 2015

(54) INSPECTION APPARATUS, INSPECTION METHOD, AND COMPUTER-READABLE STORAGE MEDIUM

(71) Applicant: CANON KABUSHIKI KAISHA, Tokyo (JP)

(72) Inventor: Masaaki Muraishi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 13/708,533

(22) Filed: Dec. 7, 2012

(65) Prior Publication Data

US 2013/0148863 A1 Jun. 13, 2013

(30) Foreign Application Priority Data

Dec. 13, 2011 (JP) ................. 2011-272164

(51) Int. Cl.
*G06K 9/00* (2006.01)
*G06T 7/00* (2006.01)
(52) U.S. Cl.
CPC .......... *G06K 9/00442* (2013.01); *G06T 7/0028* (2013.01); *G06K 9/00483* (2013.01); *G06T 2207/10008* (2013.01); *G06T 2207/30144* (2013.01); *G06T 2207/30176* (2013.01)

(58) Field of Classification Search
None
See application file for complete search history.

(56) References Cited

U.S. PATENT DOCUMENTS

| 2004/0146202 A1* | 7/2004 | Hyoki ........................... 382/209 |
| 2006/0285172 A1* | 12/2006 | Hull et al. ..................... 358/448 |
| 2012/0013733 A1* | 1/2012 | Koltermann et al. ......... 348/125 |

FOREIGN PATENT DOCUMENTS

JP 2010-249565 A 11/2010

* cited by examiner

*Primary Examiner* — Matthew Bella
*Assistant Examiner* — Weiwen Yang
(74) *Attorney, Agent, or Firm* — Canon U.S.A., Inc. IP Division

(57) ABSTRACT

An inspection apparatus performs position adjustment between a reference image and an target image in a band region of a predetermined band size by using information of a feature point in the band region having the predetermined band size and information of a feature point in a region adjacent to the band region, and performs inspection of the printed document based on the comparison of the reference image and the target image.

5 Claims, 27 Drawing Sheets

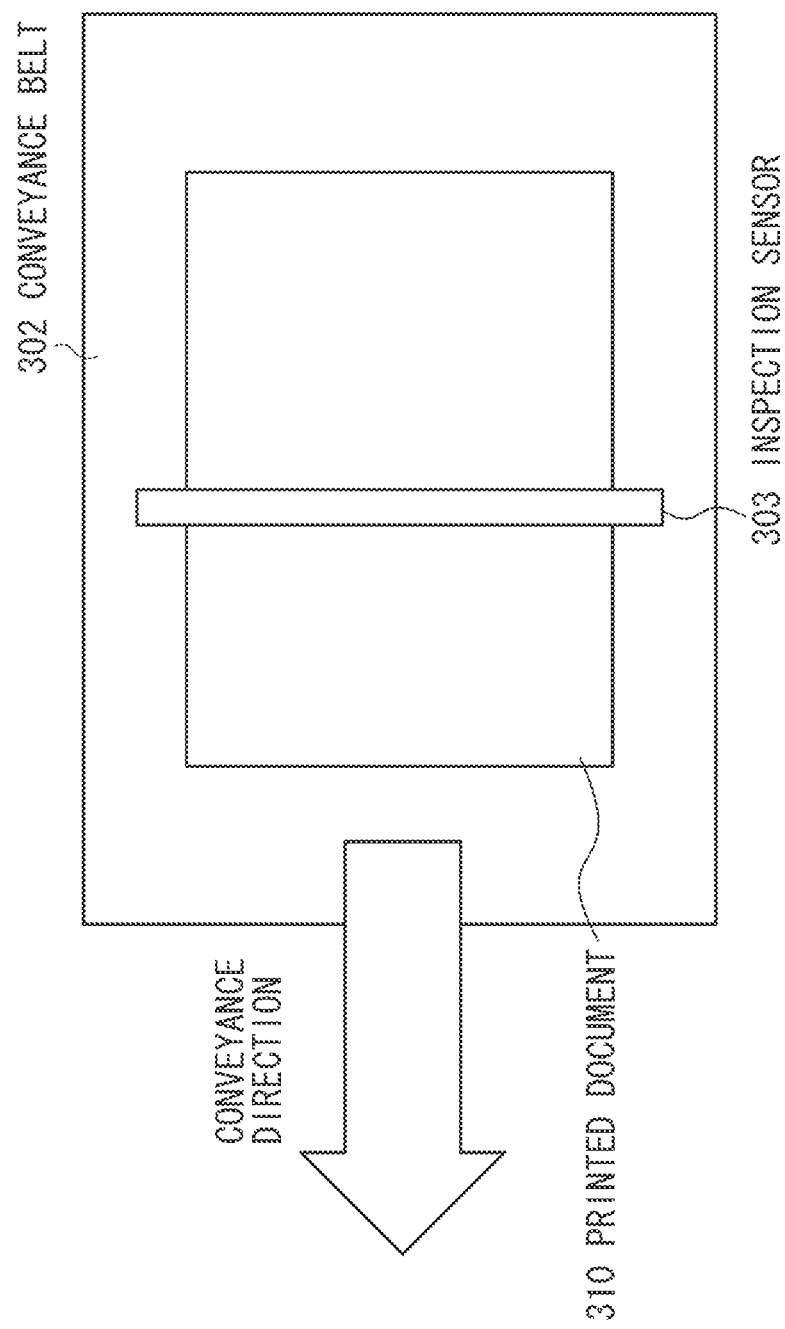

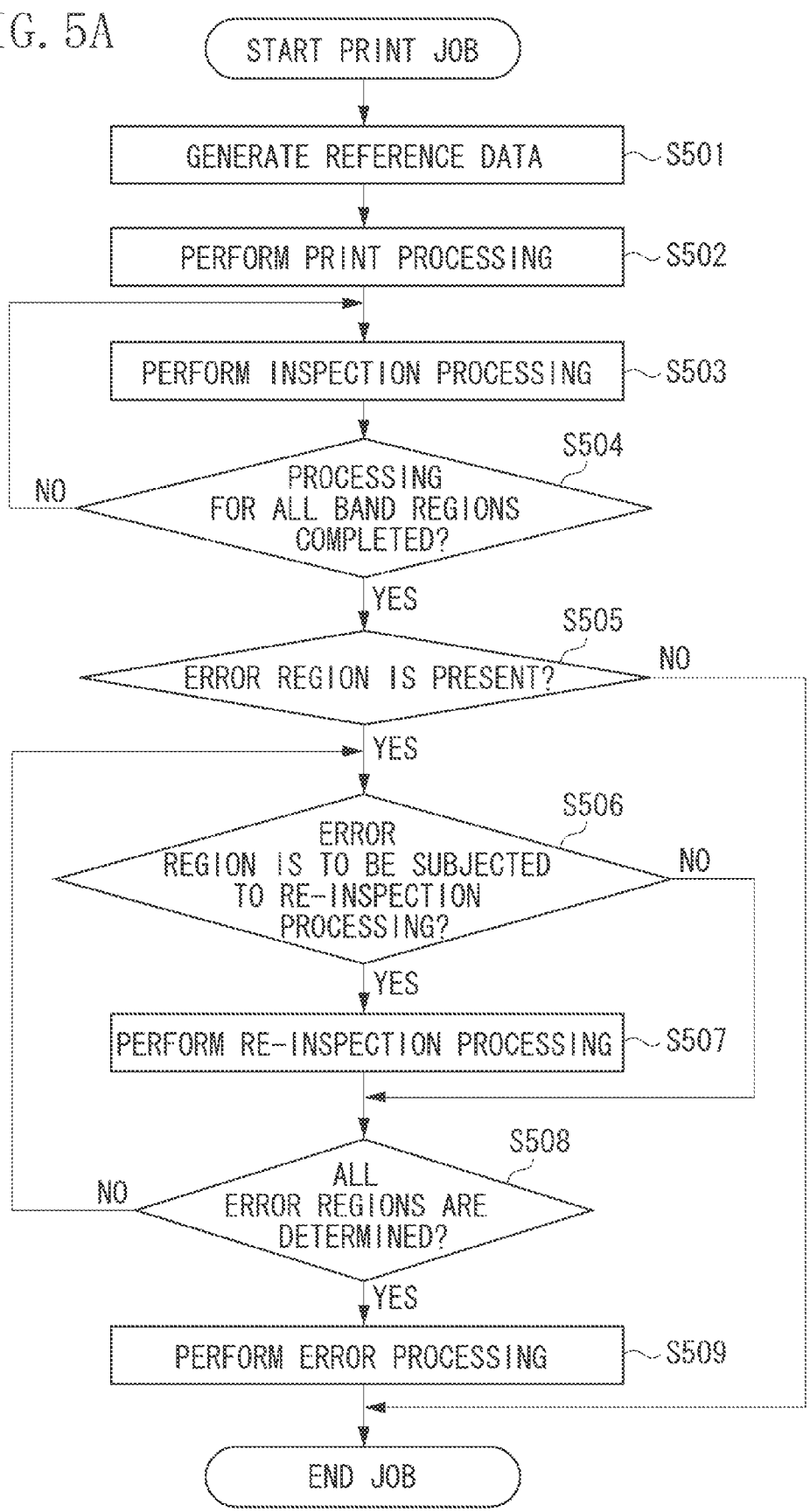

AFTER RESOLUTION CONVERSION

EDGE FEATURE

FEATURE AMOUNT IMAGE DATA

REFERENCE PATCHES

PATCH EXTRACTION

DIVISION POSITION FOR IMAGE READING

TARGET IMAGE DATA

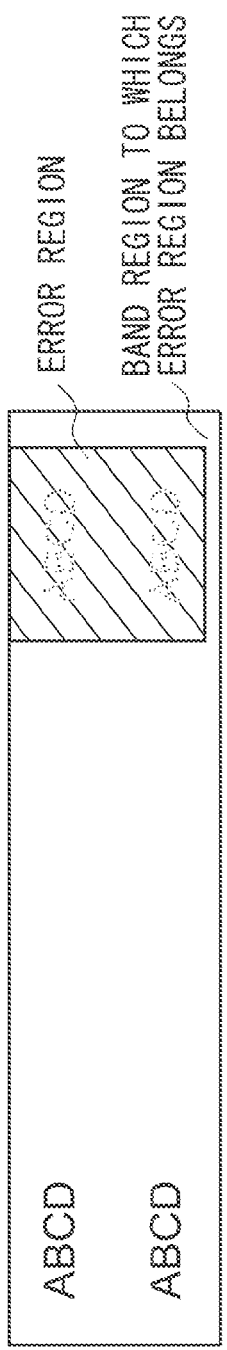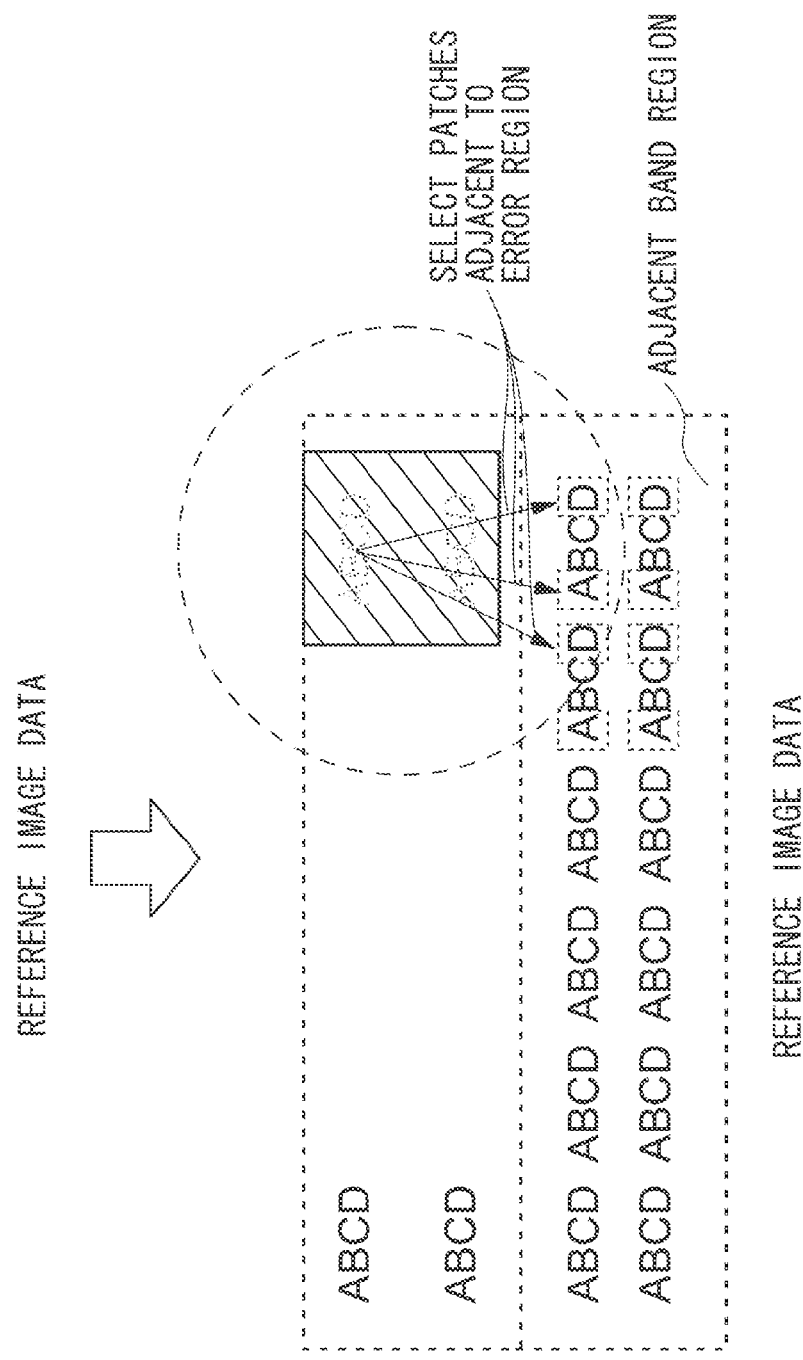

FIG. 13A
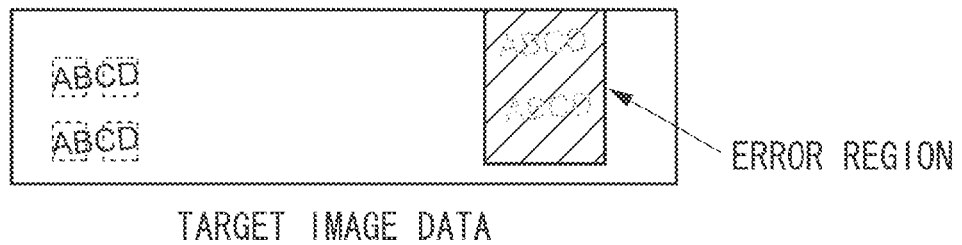
TARGET IMAGE DATA
FIG. 13B
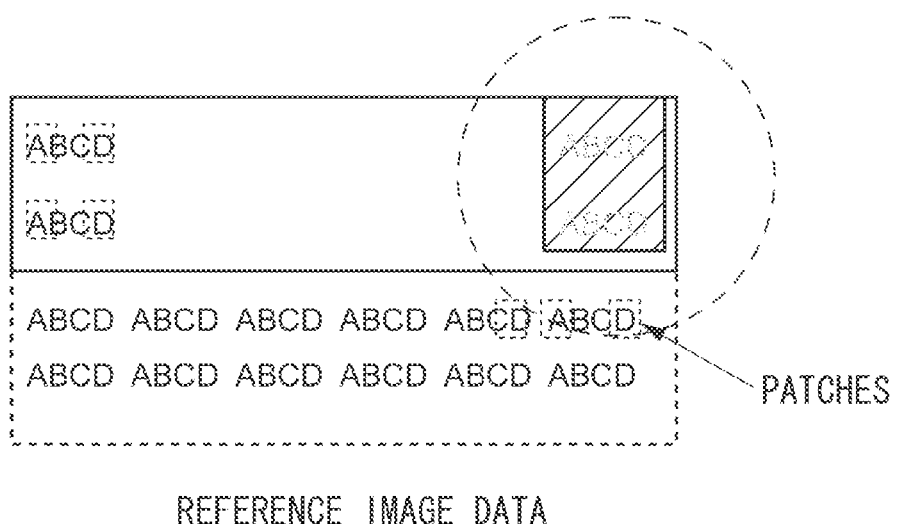
REFERENCE IMAGE DATA
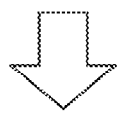
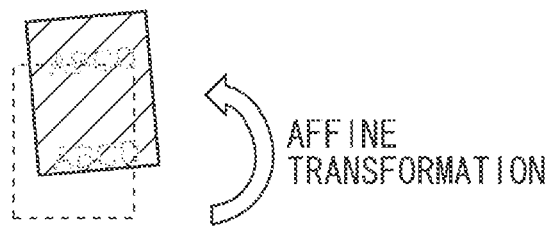
REFERENCE IMAGE DATA OF ERROR REGION
RE-POSITION-ADJUSTED BASED ON PATCH
INFORMATION OF REGION ADJACENT TO
ERROR REGION REFERENCE IMAGE DATA OF ERROR REGION RE-POSITION-ADJUSTED BASED ON PATCH INFORMATION OF REGION ADJACENT TO ERROR REGION FIG. 14
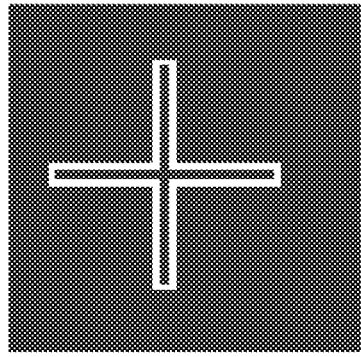
DIFFERENCE IMAGE DATA (AFTER THRESHOLD PROCESSING)
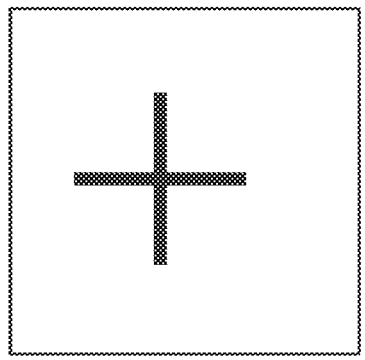
TARGET IMAGE DATA
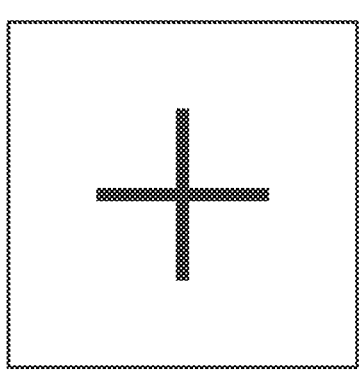
REFERENCE IMAGE DATA

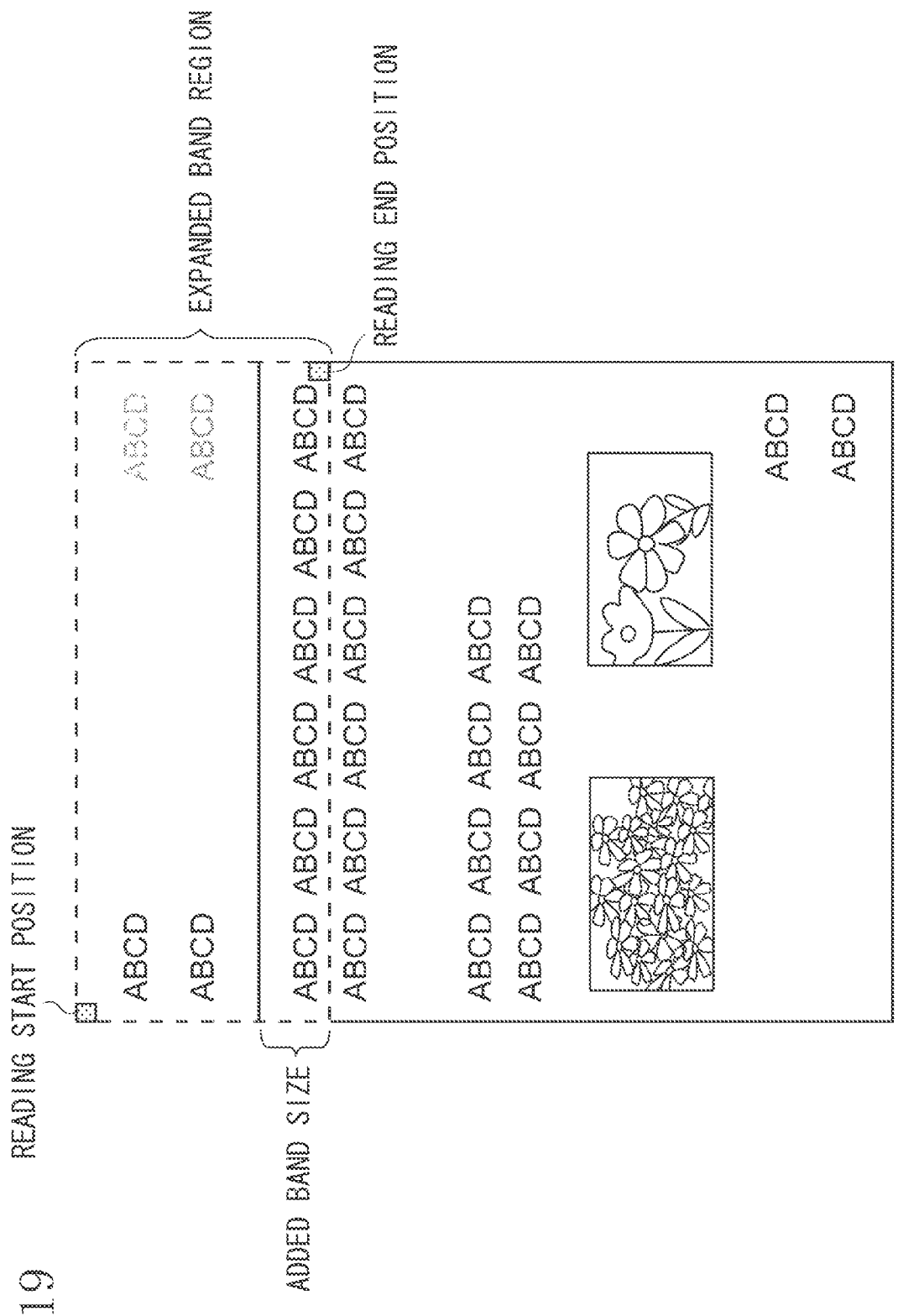

INSPECTION APPARATUS, INSPECTION METHOD, AND COMPUTER-READABLE STORAGE MEDIUM

BACKGROUND OF THE INVENTION

1. Field of the Invention

The present invention relates to a technique for inspecting printed documents. More specifically, the present invention relates to a technique for detecting a print defect of an image read from a printed document.

2. Description of the Related Art

There is a technique for inspecting a printed document to detect a print defect of the printed document. In this technique, based on an original image input into a printing apparatus, printing processing is performed. A reading apparatus scans and reads the printed document output from the printing apparatus to obtain an image thereof. Then, from the read image and the input image, feature points thereof are extracted. Using the feature points, position adjustment thereof is performed. Then, comparison processing of the read image and the input image after the position adjustment is performed. Thus, a printing defect is detected.

Japanese Patent Application Laid-open No. 2010-249565 discusses a position adjustment technique in which two steps of position adjustment processing is performed on images each divided into a plurality of areas. The technique discussed in Japanese Patent Application Laid-open No. 2010-249565 performs a first step position adjustment of specific areas to perform rough position adjustment thereof. Consequently a second position adjustment is performed to perform accurate position adjustment of the specific areas.

It is necessary for performing position adjustment processing to extract feature points for position adjustment. Therefore, if the information of the extracted feature points (e.g. the number of the extracted feature points and/or the position information of the extracted feature points) is not appropriate or sufficient to perform position adjustment processing, accuracy of the position adjustment is deteriorated.

For example, in order to reduce the capacity of the buffer memory for a read image of a printed document or to perform a real time inspection, in a case where images sequentially read by a reading apparatus is inspected sequentially for a band region of a predetermined size, sometimes information of feature points within a band region is not enough depending on the band region. That is because an image within a band region may be configured of faint characters or gradation. Therefore, even if two steps of position adjustment processing are performed on such a band region, the accuracy of the position adjustment is not improved. Thus, position adjustment processing with enough accuracy may not sometimes be performed.

SUMMARY OF THE INVENTION

According to an aspect of the present invention, an inspection apparatus configured to perform position adjustment between a reference image and a target image of a printed document to inspect the printed document includes an extraction unit configured to extract a feature point of each of the reference image and the target image used for the position adjustment, an acquisition unit configured to acquire an image in a band region of a predetermined size from each of the reference image and the target image, an position adjustment unit configured to perform a first position adjustment on the reference image and the target image in the band region, using the feature point in the band region extracted by the extraction unit, and a determination unit configured to compare the reference image and the target image after the first position adjustment and determines whether there is a difference between the reference image and the target image, wherein the position adjustment unit performs a second position adjustment using a feature point for the first position adjustment in the band region and a feature point for the position adjustment in a region adjacent to the band region in a case where the determination unit determines that there is a difference therebetween, and wherein the determination unit determines whether there is a difference between the reference image and the target image after the second position adjustment.

According to the present invention, accuracy of the inspection processing for each band region can be improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are diagrams illustrating an interior structure of an inspection unit.

FIGS. 5A and 5B are flowcharts illustrating inline inspection processing.

FIGS. 11A and 11B are diagrams illustrating adjacent patches.

FIGS. 13A, 13B, 13C, and 13D are diagrams illustrating effects of processing according to an exemplary embodiment of the present invention.

FIG. 14 is a diagram illustrating an example of difference image data.

FIG. 19 is a diagram illustrating an expansion of the band region according to the second exemplary embodiment of the present invention.

DESCRIPTION OF THE EMBODIMENTS

Various exemplary embodiments, features, and aspects of the invention will be described in detail below with reference to the drawings.

Figure 1:
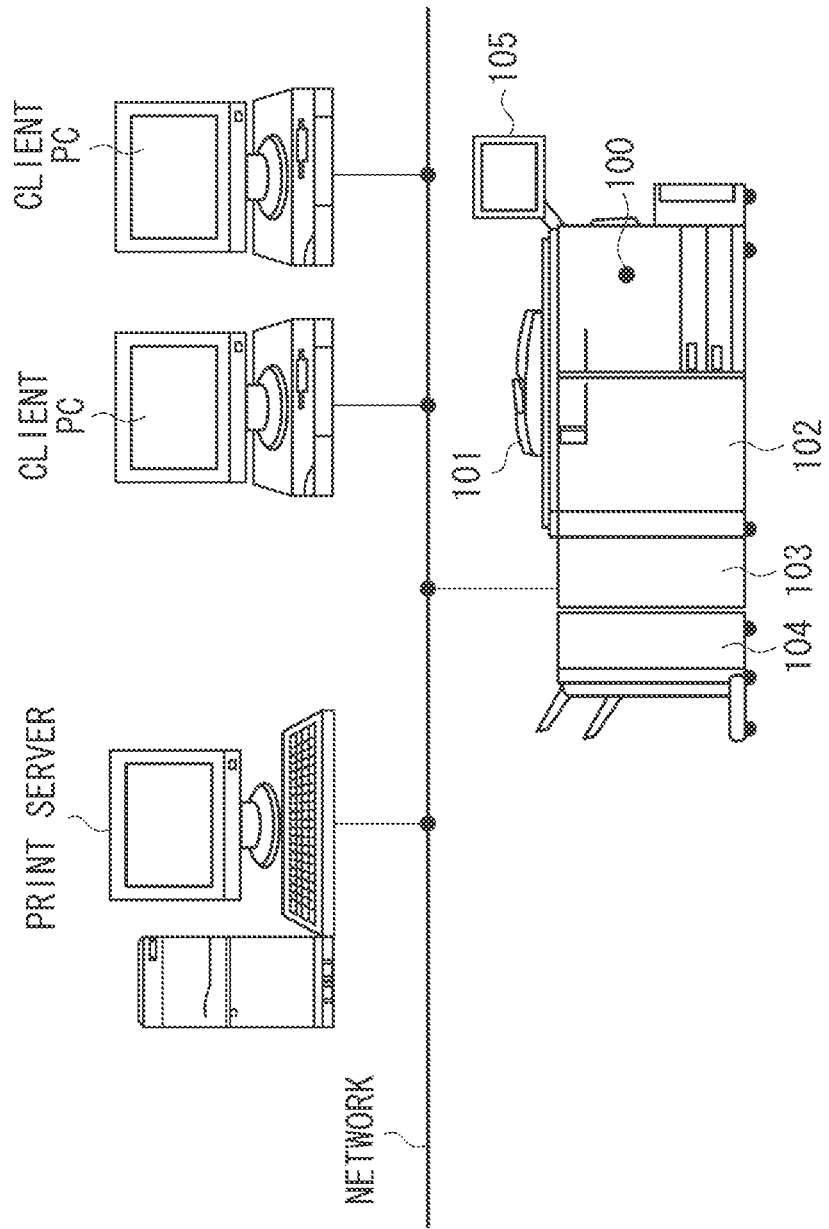
FIG. 1 is a diagram illustrating an inline inspection apparatus according to an exemplary embodiment of the present invention.

FIG. 1 is a diagram illustrating a configuration of an inline inspection apparatus including an inspection unit and a printer unit according to a first exemplary embodiment. The inline inspection apparatus is connected to an external print server and a client PC via a network.

Further, the inline inspection apparatus includes a controller unit 100, a scanner unit 101, a printer unit 102, an inspection unit 103, a finisher unit 104, and a user interface unit (UI unit) 105.

The controller unit 100 is connected to the scanner unit 101, the printer unit 102, the inspection unit 103, the finisher unit 104, the UI unit 105, and further to a network such as a local area network (LAN) to input and output image data or device information. The scanner unit 101 reads a document placed on a platen as digital data.

The printer unit 102 is a commonly used printer unit.

The printer unit 102 receives image data transmitted from the controller unit 100, and based on the received image data, performs print processing on a sheet (paper) to output a printed document. This print processing may be performed with an electrophotographic method or an ink-jet method. The types of the print processing performed by the printer unit 102 are not limited to those illustrated in the present exemplary embodiment.

The inspection unit 103 reads by an inspection sensor and inspects the printed document output from the printer unit 102. The internal configuration of the inspection unit 103 is described below.

The finisher unit 104 receives the printed document inspected by the inspection unit 103, and performs post-processing such as staple processing. Further, the finisher unit 104 includes an output tray and an escape tray (not illustrated) as a discharging destination of the printed documents. The finisher unit 104 discharges printed documents inspected by the inspection unit 103 to the output tray or the escape tray so that the inspection result of the documents can be distinguished. The UI unit 105 performs, for example, instruction to start printing and display of the image.

Figure 2:
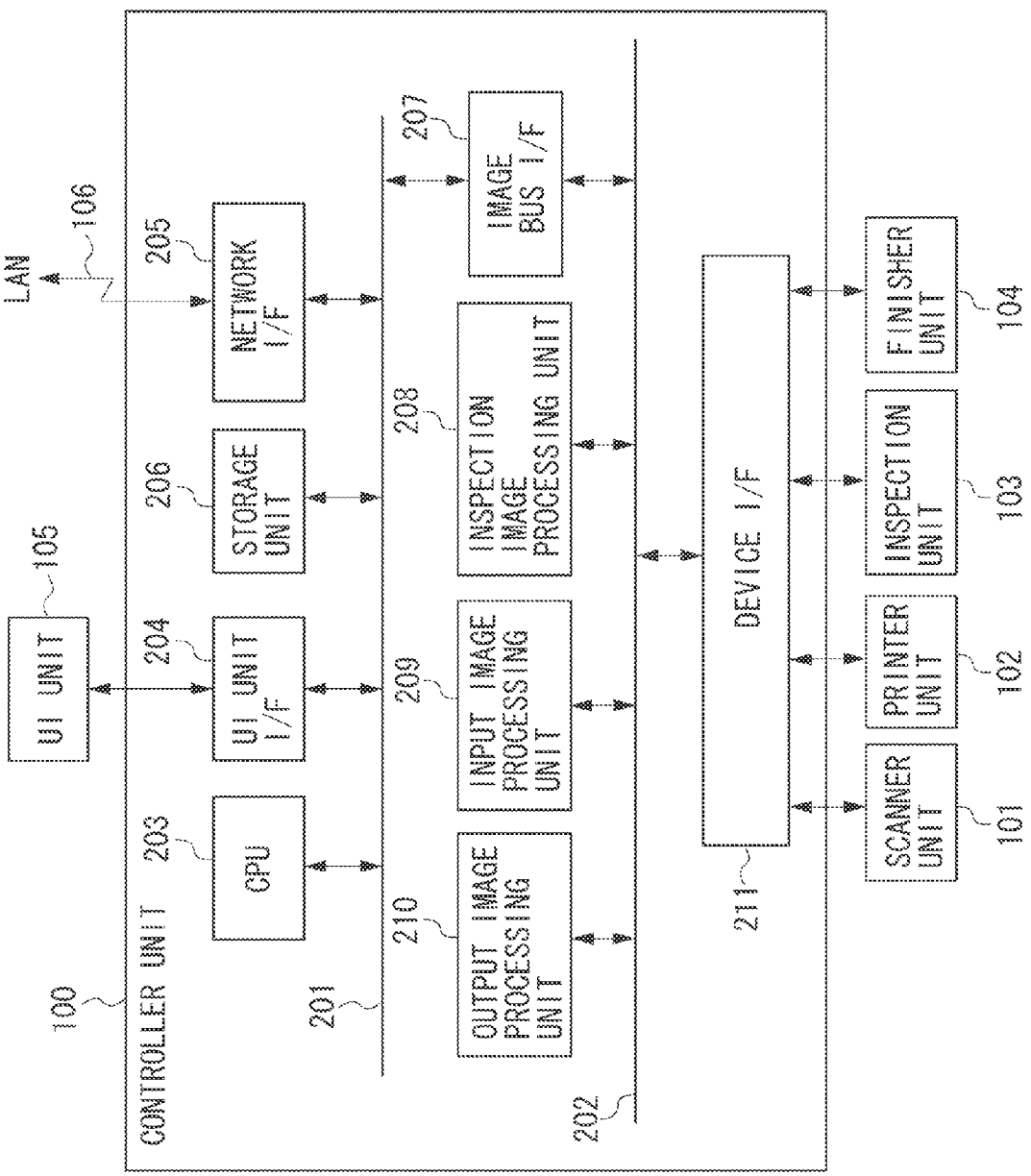
FIG. 2 is a block diagram illustrating a control system of the inline inspection apparatus according to an exemplary embodiment of the present invention.

FIG. 2 is a block diagram illustrating an internal configuration of the controller unit 100 according to the present exemplary embodiment. A CPU 203 controls each processing unit included in the controller unit 100. Further, the CPU 203 controls each processing unit to execute processing of flowcharts in FIGS. 5A and 5B by reading a computer program stored in a storage unit 206 (described below) and executing the read computer program.

The storage unit 206 stores image data and compressed data, and includes a system work memory for operating the CPU 203. Further, the storage unit 206 stores a computer program for causing the CPU 203 to execute the processing of the flowcharts in FIGS. 5A and 5B.

A UI unit I/F 204 is an interface with a UI 105, and outputs image data to be displayed on the UI unit 105, to the UI unit 105. Further, the UI unit I/F 204 transmits information input by a user via the UI unit 105 to the CPU 203.

The network I/F 205 is connected to the LAN 106 to input and output image data and various kinds of information.

These devices are connected to a system bus 201. An image bus I/F 207 is a bus bridge for connecting the system bus 201 and an image bus 202 for transferring image data at high speed, and for converting a data structure. The image bus 202 is constructed of a high speed bus such as the Peripheral Component Interconnect (PCI) bus or the Institute of Electrical and Electronics Engineers (IEEE) 1394.

A device I/F 211 connects the scanner unit 101 and the printer unit 102, which are an image input and output devices, to the controller unit 100 to transmit and receive image data.

An input image processing unit 209 performs correction, processing, and editing on the input image data such as an image read by the scanner unit 101 or an image externally received via the LAN 106. Thereafter, the input image processing unit 209 performs processing suitable for the print output or image transmission.

An output image processing unit 210 performs correction processing according to the characteristics of the printer unit 102 on the image data processed by the input image processing unit 209. Then, the output image processing unit 210 transmits the processed image data to the printer unit 102 via the device I/F 211. Further, the printer unit 102, which receives the transmitted image data, performs print processing based on the image data to output the printed document.

An inspection image processing unit 208 performs inspection processing on the image data of the printed document read by the inspection unit 103. Further, the inspection image processing unit 208 generates data to be used for the inspection processing for the input image data such as an image read by the scanner unit 101 or an image externally received via the LAN 106.

Figure 3A:
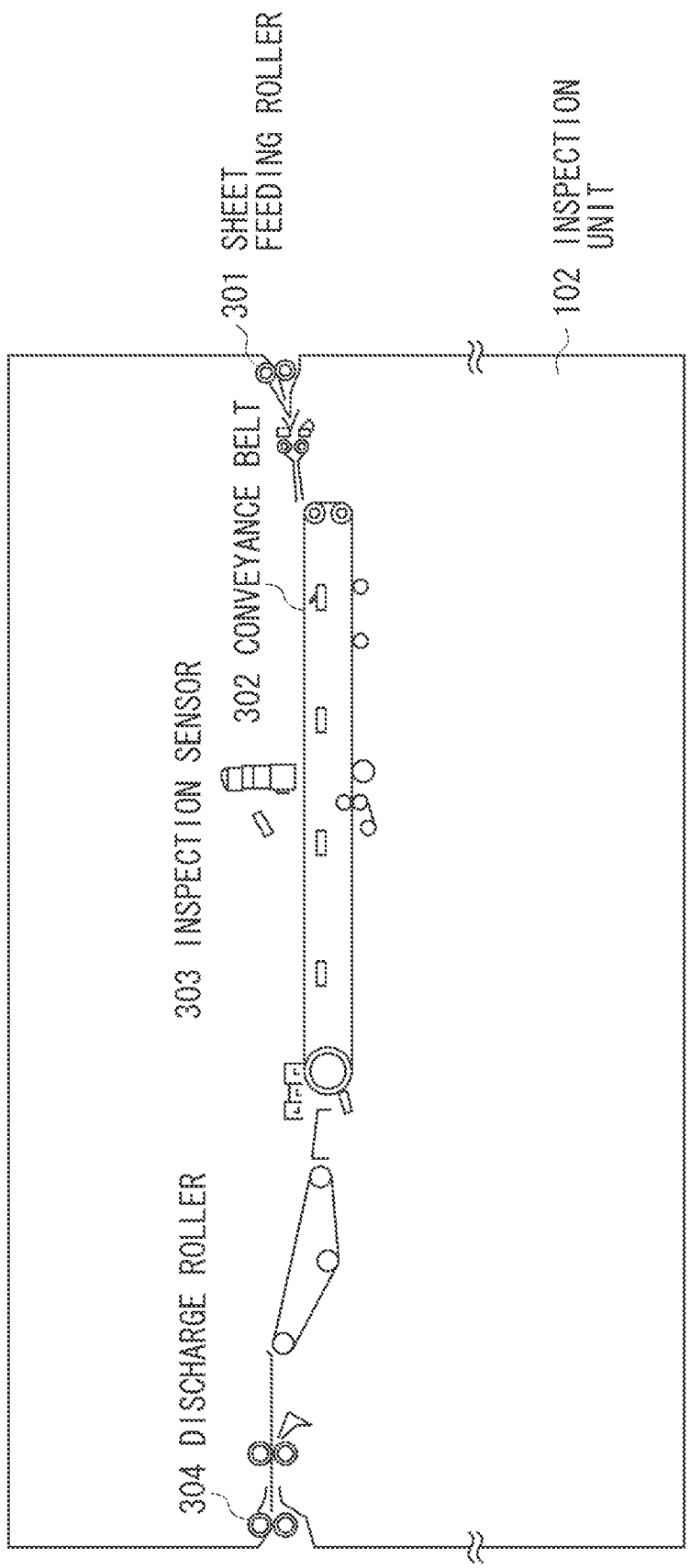

FIGS. 3A and 3B illustrate an example of the internal configuration of the inspection unit 103.

FIG. 3A is a cross-section diagram of the inspection unit 103. The printed document output from the printer unit 102 is drawn in the inside of the inspection unit 103 by a sheet feeding roller 301. Then, while the printed document is being conveyed on a conveyance belt 302, an inspection sensor 303 provided on the conveyance belt 302 reads the image on the printed document. The image data read by the inspection sensor 303 is called the scanned image data.

The printed document is output from a discharge roller 304 to the finisher unit 104 after the inspection image processing unit 208 performs inspection processing (described below) using the read image. Meanwhile, another inspection sensor 303 (not illustrated) may be arranged under the conveyance belt 302 to read the back side of the printed document to handle the two-sided printed document.

FIG. 3B is a top view illustrating a portion of the conveyance belt 302 seen from above. In the present exemplary embodiment, the inspection sensor 303 reads the whole image of a conveyed printed document 310 along the conveyance direction of the printed document 310 successively line by line. Then, the read image is transmitted to the inspection image processing unit 208.

<Configuration of Inspection Image Processing Unit>

FIG. 14 illustrates a configuration of the inspection image processing unit 208.

Figure 4A:
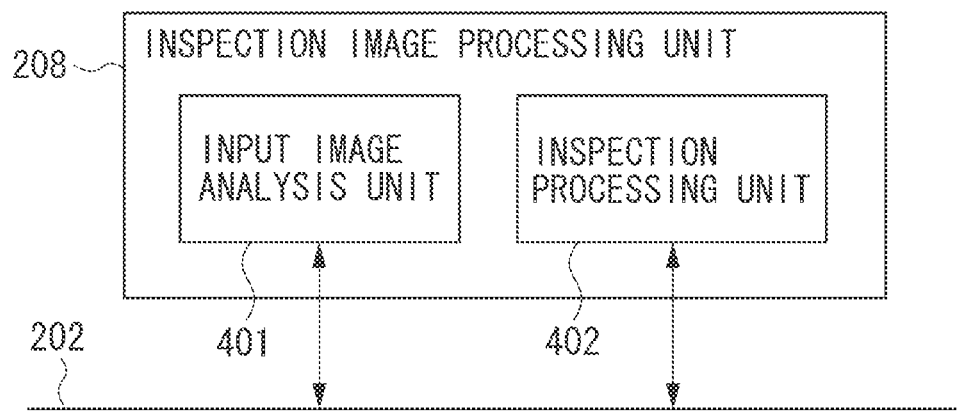
FIGS. 4A, 4B, and 4C are block diagrams illustrating a target image processing unit according to a first exemplary embodiment of the present invention.

FIG. 4A illustrates the configuration of the inspection image processing unit 208 illustrated in FIG. 2. The inspection image processing unit 208 includes an input image analysis unit 401 and an inspection processing unit 402, and performs inspection processing.

An input image analysis unit 401 generates reference data to be used by the inspection processing unit 402 from the input image data such as an image read by the scanner unit 101 or an image externally received via the LAN 106. Detailed configuration thereof is described below with reference to FIG. 4B.

The inspection processing unit 402 detects print defects of the printed document, based on the reference data generated by the input image analysis unit 401 and the scanned image data of the printed document acquired by the inspection sensor 303. Detailed configuration thereof is described below with reference to FIG. 4C.

The inline inspection processing according to the present exemplary embodiment will be described with reference to FIG. 5A. A series of processing illustrated in the flowchart in FIG. 5A is performed by the CPU 203 reading and executing a computer program stored in the storage unit 206 to control operations of each processing unit.

In step S501, the input image analysis unit 401 analyzes the input image data to generate reference data, and stores it in the storage unit 206.

In step S502, the input image processing unit 209 and the output image processing unit 210 performs image processing on the input image data, to generate and transmit image data, which can be processable by the printer unit, to the printer unit 102. The printer unit 102 performs print processing based on the received image data to output a printed document.

In step S503, the inspection processing unit 402 performs inspection processing on the scanned image data to be input for each band region (described below). With this processing, a pixel determined to be print defective and a peripheral region of the pixel determined to be print defective is called an error region.

In step S504, the inspection processing unit 402 determines whether the inspection processing is performed on the scanned image data in all the band regions for a page. If it is determined that the processing is performed (YES in step S504), the processing proceeds to step S505. Otherwise (NO in step S504), the processing continues to return to step S503 until the inspection is performed on the scanned image data in all the band regions.

In step S505, the inspection processing unit 402 determines whether an error region is present. If it is determined that an error region is present (YES in step S505), the processing proceeds to step S506. Otherwise (i.e., no error region is present in the scanned image data for a page) (NO in step S505), the processing is ended.

In step S506, the inspection processing unit 402 determines for an error region whether the error region is to be subjected to re-position-adjustment and re-inspection processing. If it is determined that the error region is to be subjected to re-position-adjustment and re-inspection processing (YES in step S506), the processing proceeds to step S507. Otherwise (NO in step S506), the processing proceeds to step S508.

In step S507, the inspection processing unit 402 performs re-inspection processing on the error region that is determined that the re-inspection processing is to be performed in step S506.

In step S508, the inspection processing unit 402 determines whether the processing in step S506 is performed on all the error regions. If it is determined that the processing is performed on all the error regions (YES in step S508), the processing proceeds to step S509. Otherwise (NO in step S508), the processing proceeds to step S506 to perform the processing in step S506 on all the error regions.

In step S509, the CPU 203 performs error processing in response to the processing result performed in steps S506 to S508. The processing performed in step S509 is described below.

First, the CPU 203 determines whether the error data is stored in the storage unit 206. The error data is the result of the re-inspection processing performed in steps S506 to S508. As a result of the determination, if the error data is not stored in the storage unit 206, the CPU 203 determines that there is no print defect on the printed document. Then, the CPU 203 controls the finisher unit 104 to discharge the printed document to the output tray of the finisher unit 104.

On the other hand, the error data is stored in the storage unit 206, the CPU 203 determines that a print defect exists on the printed document. Then, the CPU 203 controls the finisher unit 104 to discharge the printed document to the escape tray of finisher unit 104.

Alternatively, in this case, the CPU 203 may control the printer unit 102 to stop the subsequent print processing, and to display the error region coordinates of the error data and the error region image of the error data stored in the storage unit 206 on the UI unit 105. Hereinabove, the detailed processing in step S509 is described.

The above-described series of processing performed in steps S501 to S509 are the inline inspection processing according to the present exemplary embodiment.

The input image analysis unit 401 performs the processing in step S501. The input image analysis unit 401 will be described in detail below.

Figure 4B:
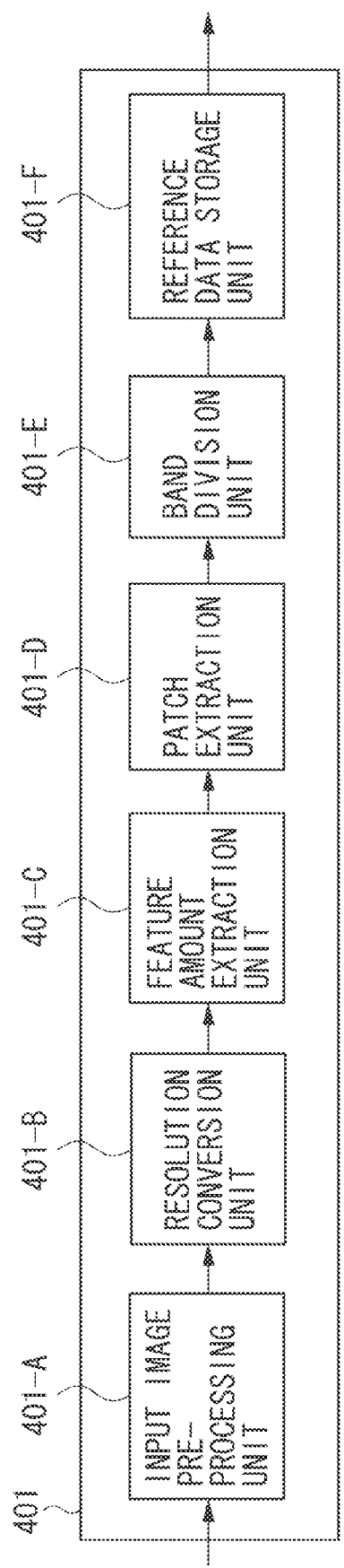

Referring to FIG. 4B, a configuration of the input image analysis unit 401 is described in detail. FIG. 4B is a block diagram of the input image analysis unit 401. The input image analysis unit 401 includes an input image pre-processing unit 401-A, a resolution conversion unit 401-B, a feature amount extraction unit 401-C, a patch extraction unit 401-D, a band division unit 401-E, a reference data storage unit 401-F.

The input image pre-processing unit 401-A performs processing on the input image data in consideration of the optical characteristics of the inspection sensor 303. The processing in consideration of the optical characteristics is, for example, smoothing processing in consideration of the blur of the image data caused by the inspection sensor 303. That is, a portion having strong and weak densities is read with a gentle slope.

The resolution conversion unit 401-B generates image data, which is converted from the image data processed by the input image pre-processing unit 401-A into the image data with a resolution (for example, 300 dpi) that can be compared with a scan image read by the inspection sensor 303. The image data generated at this time is referred to reference image data.

In addition, the image data including the same content as the image to be printed on a sheet is referred to as an original image. In the present exemplary embodiment, the input image data, the image data having processed by the input image pre-processing unit 401-A, and the reference image data are the original images.

Figure 8A:
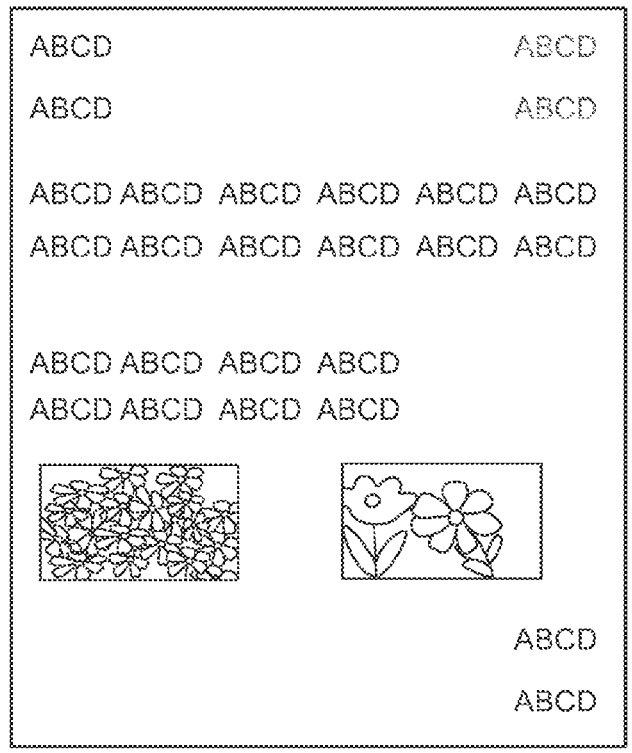
FIGS. 8A, 8B, 8C, and 8D are diagrams illustrating states of processing performed by an input image analysis unit.

FIG. 8A illustrates an example of the reference image data. FIG. 8A illustrates that the reference image data is configured of dark and faint color characters and pictures.

The feature amount extraction unit 401-C extracts a feature amount of the image from the reference image data generated by the resolution conversion unit 401-B. In the present exemplary embodiment, the feature of an image indicates an edge feature of the image (density difference of an image), the feature amount extraction unit 401-C, for example, using 5×5 edge extraction filterer, extracts edge feature intensity (edge intensity) as feature amount image data.

Figure 8B:
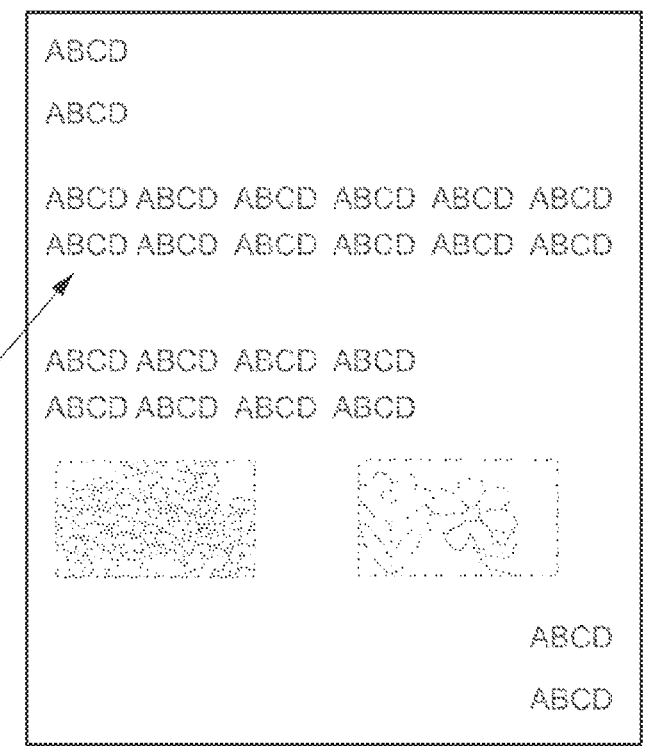

FIG. 8B illustrates an example of the feature amount image data. In FIG. 8B, portions having strong edge feature (edge intensity is strong) are expressed to be dark. As is seen there-from, as the feature amount image data, among the reference image data, outlines of the dark color characters are well extracted.

The patch extraction unit 401-D extracts, as a patch region (reference patch) to be used for position adjustment, a peripheral region of the pixel of the reference image data having a large feature amount (central pixel), using the feature amount image data extracted by the feature amount extraction unit 401-C. Herein, for example, the pixel having an edge intensity higher than a predetermined threshold is set to be the central pixel.

Then, the patch extraction unit 401-D extracts the peripheral region of the 128×128 pixels (patch size) including the central pixel as a reference patch. The patch extraction unit 401-D generates the reference image data in the reference patch, the coordinate position of the central pixel (central coordinate position), the intensity of the feature amount as patch information.

In addition, in a case where a plurality of reference patches are overlapped since the distance between the central pixels is short, the patch extraction unit 401-D extracts the central pixel with a higher feature amount as a reference patch. In other words, the patch extraction unit 401-D extracts a feature point of the reference image data.

Figure 8C:
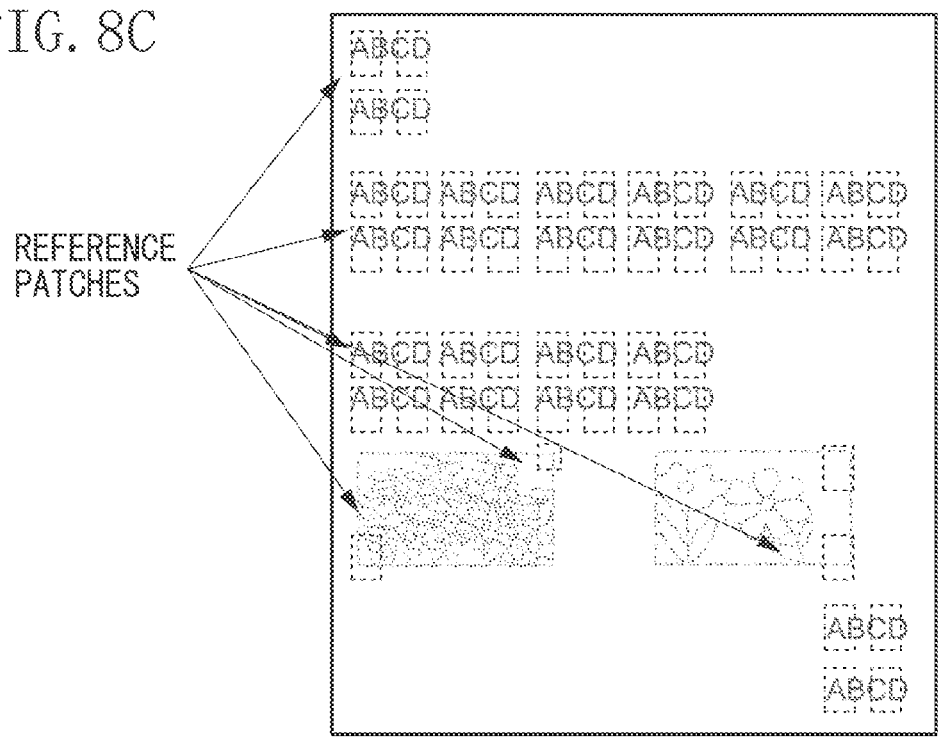

FIG. 8C illustrates a result in which reference patch is extracted from the feature amount image data. FIG. 8C illustrates that the reference patches are extracted well from the portions of the reference image data having dark color characters.

The band division unit 401-E determines a size of each band region (band size) for comparing the target image data (described below) and the reference image data for each image region with a predetermined size (band region). Then, the band division unit 401-E determines a reading start position and a reading end position of each band region for reading out the reference image data by each determined band size for each band region.

More specifically, in the present exemplary embodiment, the band division unit 401-E determines each band size to be an equal predetermined size. Then, the band division unit 401-E determines the reading start position of the first band region to be a leading position of the reference image data. Then, the band division unit 401-E determines the reading end position of the first band region to be a position where a predetermined band size is added to the reading start position.

Then, the band division unit 401-E determines the reading start position of the second band region as the first reading end position, and the reading end position of the second band region to be a position where a predetermined band size is added to the reading start position of the second band region. The reading start positions and reading end positions of the third band region and subsequent band regions are determined similarly as described above.

Figure 8D:
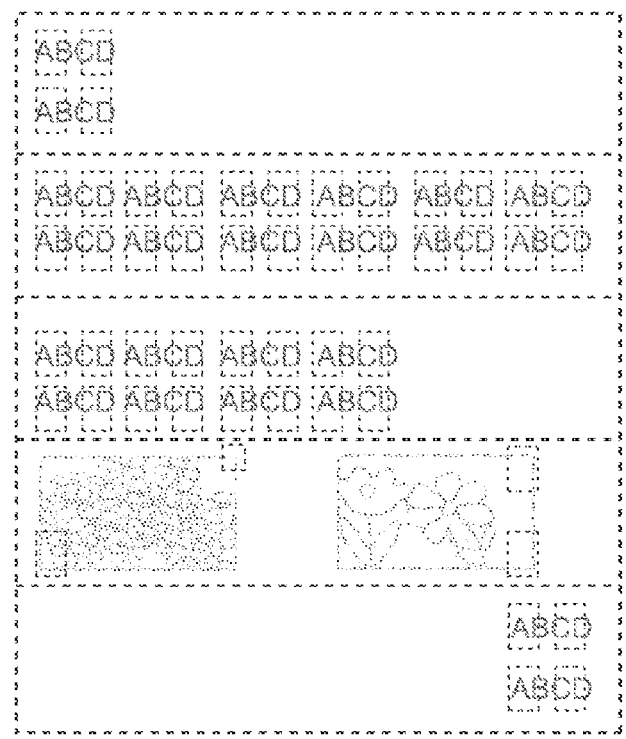

FIG. 8D is a schematic diagram illustrating a state where an image is divided into a plurality of band regions by the band size determined by the band division unit 401-E. FIG. 8D illustrates that reference image data is divided into 5 band regions each having an equal band size. Herein, the band regions are divided by the band borders. However, since the corresponding pixels may exist over the band borders when the position adjustment is performed, a plurality of pixels is set as overlap pixels. In this case, the band region size and the reading start position and the reading end position of each band region are set to be values including values for an overlapped region.

Further, viewing FIG. 8D in detail, in the second band region (second band region from the top), sufficient reference patches are arranged over the entire band region evenly. Further, in the fourth band region, though the number of the reference patches is few, it is understandable that reference patches are arranged on both sides of the band region.

On the other hand, in the first band region, it is understandable that reference patches are arranged on the left side unevenly. In this case, if the reference patches are arranged on the right side unevenly with respect to the left side of the band region, in the position adjustment described below, the position adjustment of the right side will fail (see FIG. 9B). Then, since faint color characters are located on the right side of the first band region of the reference image data, in the inspection determination described below, it is determined to be a print defect (see FIGS. 9C and 9D).

Lastly, a reference data storage unit 401-F is described. The reference data storage unit 401-F stores the following data of (1) to (3) as reference data in the storage unit 206.
(1) reference image data generated by the resolution conversion unit 401-B.
(2) patch information of each reference patch generated by the patch extraction unit 401-D.
(3) a reading start position and a reading end position of each band region determined by the band division unit 401-E.

The detailed configuration of the input image analysis unit 401 has been described above. In addition, the processing in step S501 is performed by executing the processing by the input image pre-processing unit 401-A to the reference data storage unit 401-F in sequence.

The inspection processing unit 402 performs the processing in steps S503 to S508. The inspection processing unit 402 is described below.

Figure 4C:
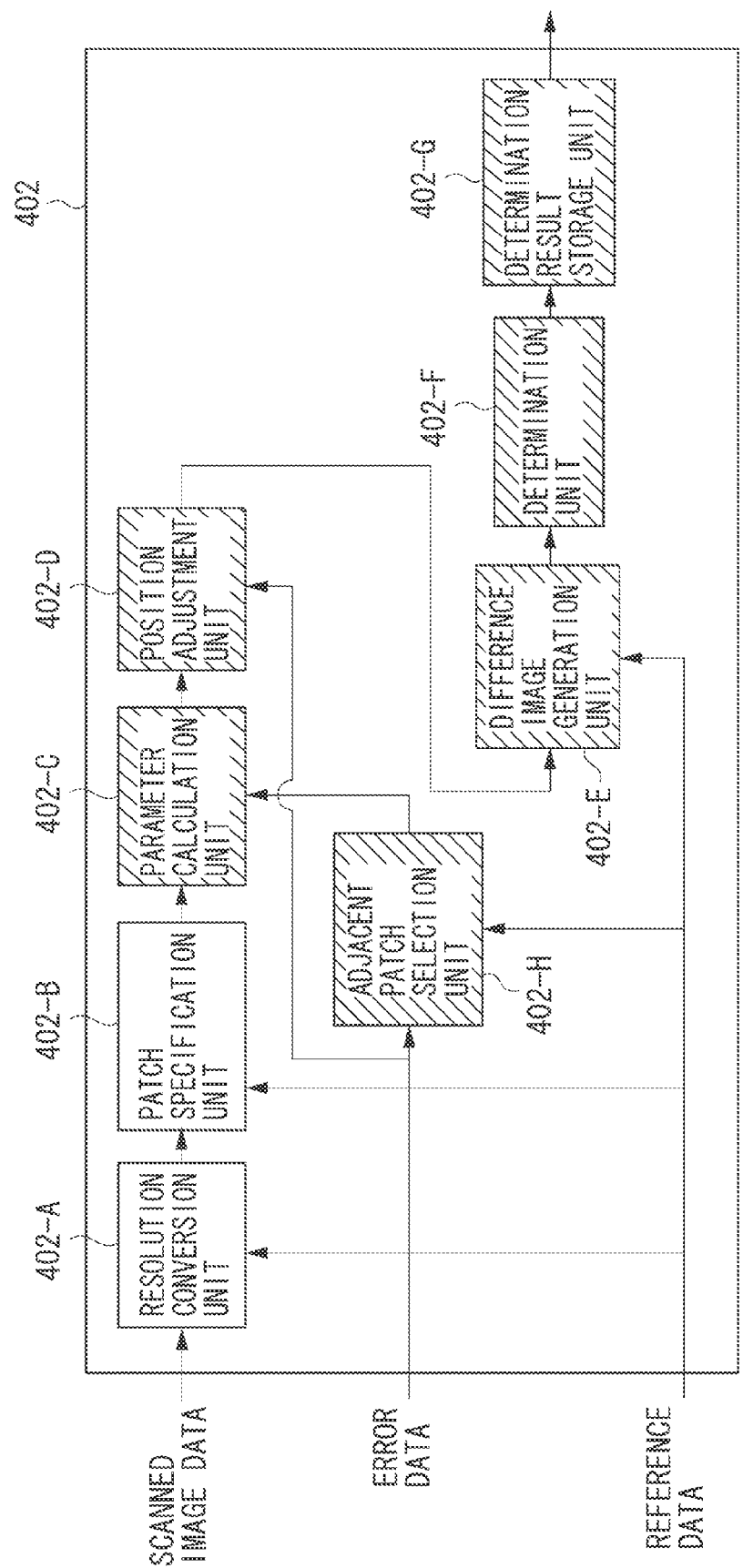

First, referring to FIG. 4C, the detailed configuration of the inspection processing unit 402 is described, and then, the detailed processing performed in steps S503, S506, and S507 is described.

FIG. 4C is a block diagram illustrating the inspection processing unit 402. The inspection processing unit 402 includes a resolution conversion unit 402-A, a patch specification unit 402-B, a parameter calculation unit 402-C, a position adjustment unit 402-D, a difference image generation unit 402-E, a determination unit 402-F, a determination result storage unit 402-G, an adjacent patch selection unit 402-H.

The resolution conversion unit 402-A receives scanned image data corresponding to a band region, to convert it into image data with an equivalent resolution to the reference image data (for example, 300 dpi). The scanned image data after resolution conversion is referred to as a target image data (refer to FIG. 9A).

In addition, the image data representing the same content as the image content printed on a sheet is also referred to as an inspection image. In the present exemplary embodiment, the scanned image data, and the target image data are referred to as an inspection image.

The patch specification unit 402-B specifies the coordinates corresponding to the central coordinates of the reference patch in the target image data in the band region, using the reference data stored in the storage unit 206.

Figure 10A:
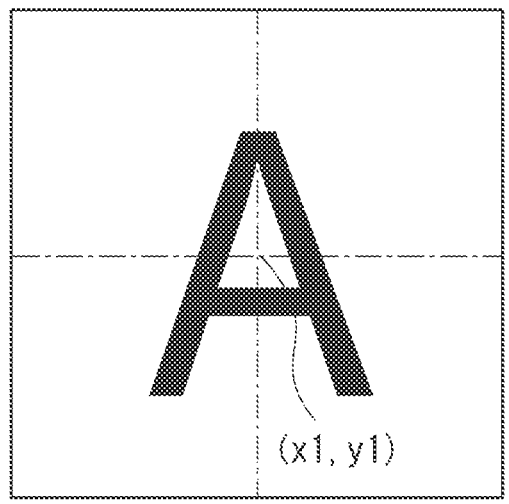
FIGS. 10A and 10B is a diagram illustrating a correspondence relationship of coordinate positions.
Figure 10B:
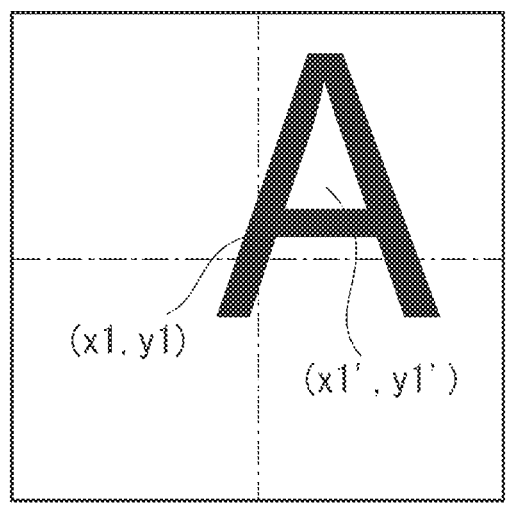

As illustrated in FIG. 10, for example, the patch specification unit 402-B specifies the coordinate position (x1', y1') (corresponding coordinate position) in the target image data (target patch) corresponding to the central coordinate position (x1, y1) of the reference patch. A known method is used for the specification.

The parameter calculation unit 402-C calculates parameters (position adjustment parameters) to be used for the position adjustment between the reference image data and the target image data. In addition, in the present exemplary embodiment, the position adjustment is performed by using affine transformation, and the position adjustment parameters are "a" to "f" in the following equation 1.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \quad \text{equation 1}$$

The parameters a, b, c, d, e, f to be used in the conversion equation 1 are calculated using the least-square method based on the relationship between the central coordinate position of the reference image data and the corresponding coordinate position of the target image data. More specifically, the parameter calculation unit 402-C obtains a conditional expression for each reference patch, and, using the obtained conditional expression, the parameter calculation unit 402-C calculates parameters satisfying the conditional expression. The conditional expression is such that the x, y, x', and y' in the conversion equation are substituted by the x1, y1, x1', and y1' of the coordinate position, which correspond to each other, and specified by the patch specification unit 402-B.

Figure 9A:
FIGS. 9A, 9B, 9C, and 9D are diagrams illustrating a case where accuracy of position adjustment is not enough.
Figure 9B:
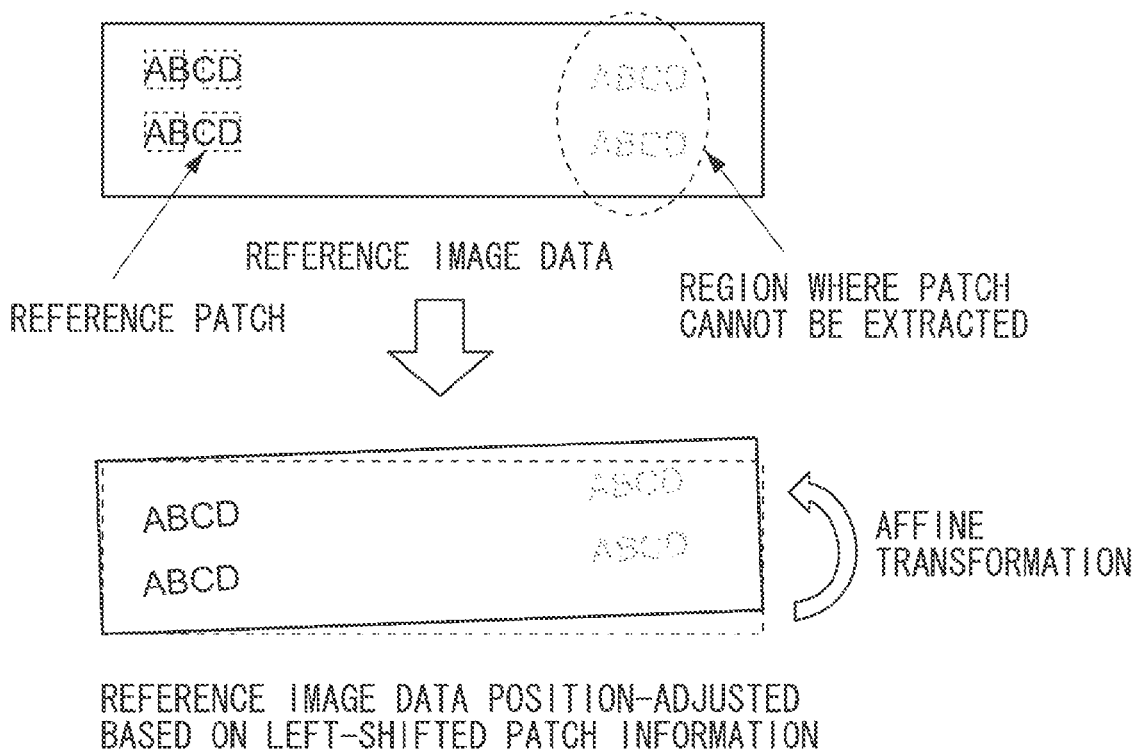

The position adjustment unit 402-D performs the position adjustment between the reference image data and the target image data using parameters calculated by the parameter calculation unit 402-C (refer to FIG. 9B).

Figure 9C:
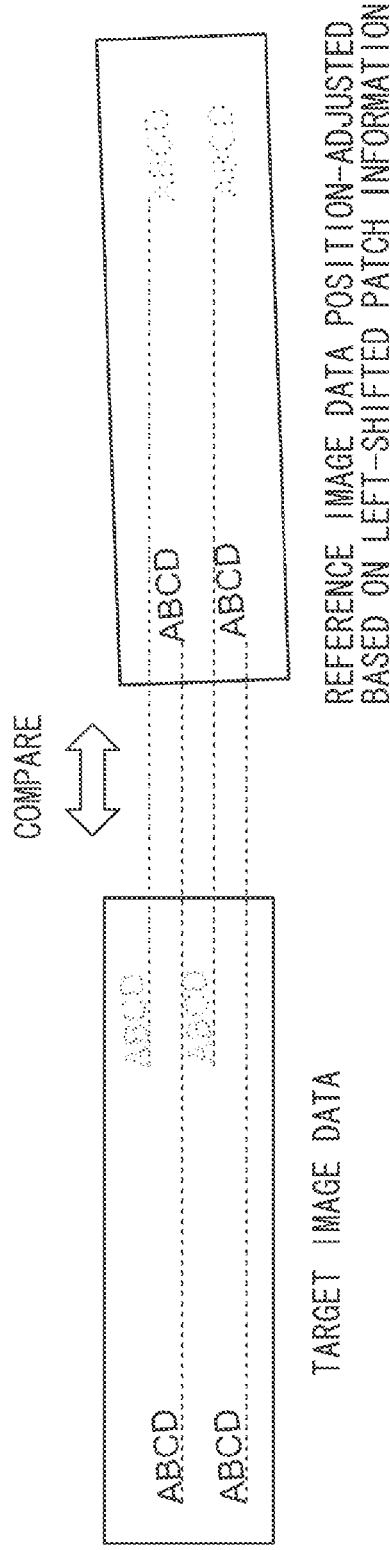

The difference image generation unit 402-E compares the position adjusted reference image data and the target image data to generate difference image data (refer to FIG. 9C).

Figure 9D:
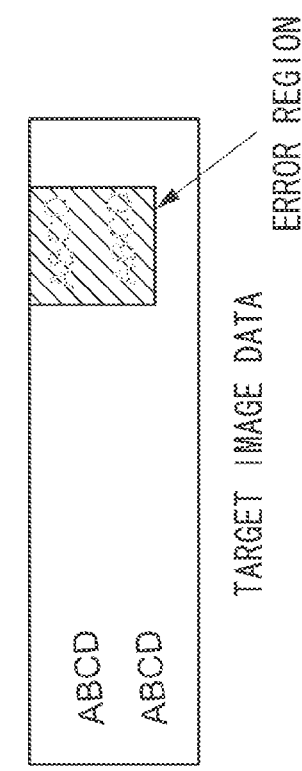

The determination unit 402-F determines whether a print defect is present based on the difference image data generated by the difference image generation unit 402-E (refer to FIG. 9D).

The determination result storage unit 402-G stores in the storage unit 206 error data of a pixel which the determination unit 402-F has determined to be a print defect. The error region is a peripheral region including the pixel determined to be a print defect and adjacent pixels (for example, 128×128 pixels).

The adjacent patch selection unit 402-H determines whether a reference patch is present in a region adjacent to the coordinate position of the pixel having determined to be a print defect by the determination unit 402-F. If the reference patch is present, the adjacent patch selection unit 402-H transmits the patch information of the adjacent reference patch to the parameter calculation unit 402-C.

Figure 6A:
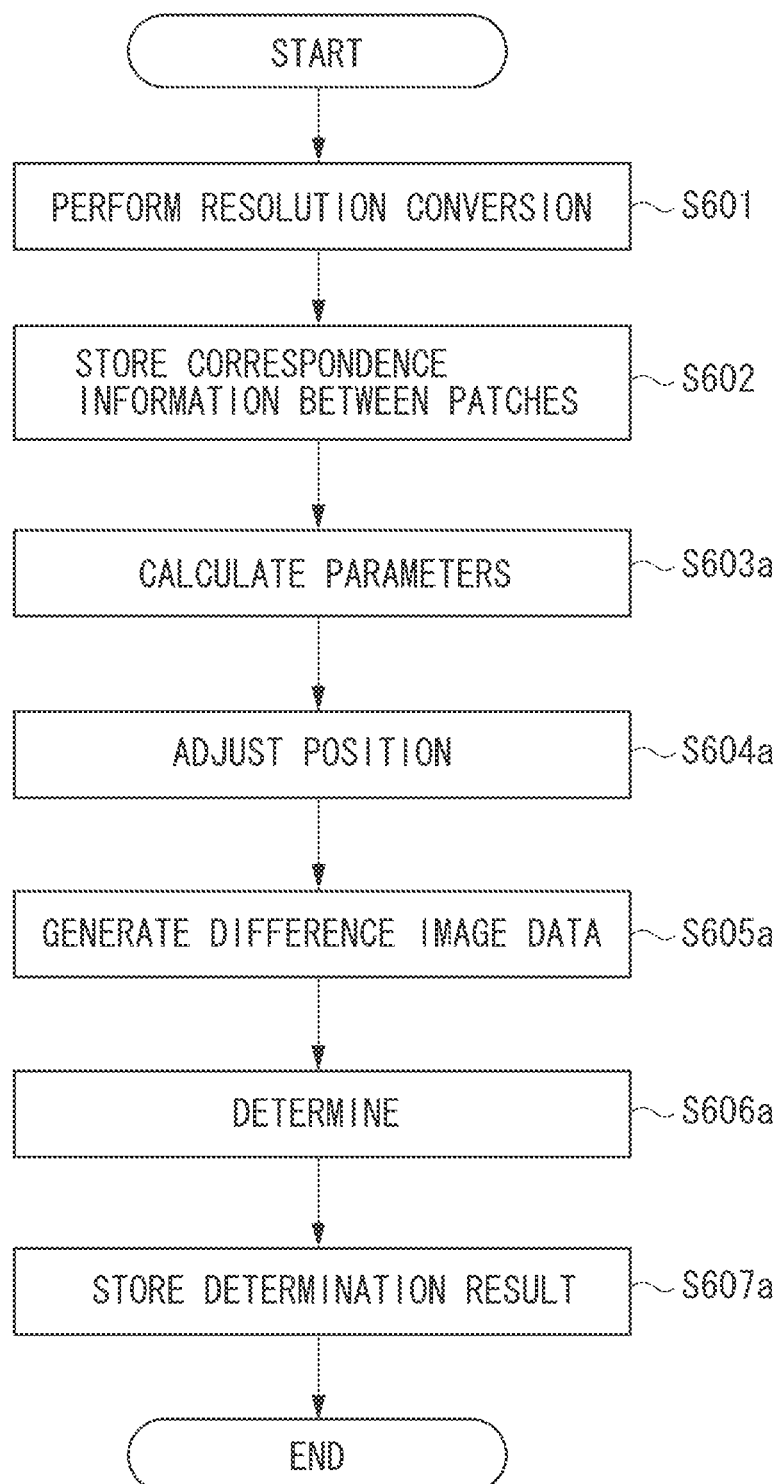
FIGS. 6A and 6B are flowcharts illustrating a processing flow of the target image processing unit.

The processing in step S503 is described in detail referring to FIG. 6A. FIG. 6A is a flowchart illustrating a processing flow performed in step S503. This processing is performed for each band region that is to be a processing target. When the series of processes performed in step S601 to S607a are completed, to set the next band region as a processing target, the reading start position and the reading end position of the band region are updated.

In step S601, the resolution conversion unit 402-A receives the reference data to obtain the reading start position and the reading end position of the band region that is set to be a processing target, and specifies the size of the band region (band size) based on the difference between the reading end position and the reading start position.

Then, the resolution conversion unit 402-A receives scanned image data for each line, performs buffering of the scanned image data corresponding to the band size, and performs resolution conversion on the scanned image data in the band region.

FIG. 9A illustrates an example of target image data. The dark color character images and the faint color character images are read in the target image data in a skewed manner.

Further, the resolution conversion unit 402-A obtains the reference image data in the band region that is a processing target using the reading start position and the reading end position of the reference image data stored in the storage unit 206.

In step S602, the patch specification unit 402-B specifies the corresponding coordinate position that corresponds to the central coordinate position of the reference patch by using the reference data stored in the storage unit 206.

The specific processing is described below. The patch specification unit 402-B obtains patch information included in the reference image data of the band region which is the target of the processing.

Then, the patch specification unit 402-B obtains the reference image data of the reference patch (reference patch image) and the central coordinate position of the reference patch from the obtained patch information (refer to FIG. 10A). The upper figure in FIG. 9B illustrates an example reference patch.

The patch specification unit 402 obtains target image data (target patch image) in the region having the same size as the patch size of the reference patch with the same coordinate position of the central coordinate position of the reference patch as a center.

Then, the patch specification unit 402-B calculates the shift amount between the images using a known method. Examples of the methods include, for example, a method in which the fast Fourier transformation (FFT) processing is performed on both of the reference patch image and the target patch image to obtain a cross-correlation coefficient in a frequency space of the images, and the peak value of the coefficient is obtained as the shift amount. The shift amount indicates the amount of the shift of the central coordinate position with respect to the corresponding coordinate position.

The patch specification unit 402-B calculates the corresponding coordinate position of the target patch from the obtained shift amount and the central coordinate position of the reference patch. Further, the patch specification unit 402-B stores in the storage unit 206 information indicating the correspondence relationship between the central coordinate position and the corresponding coordinate position (inter-patch correspondence information) so that, by referring to the central coordinate position of the reference patch, the corresponding coordinate position of the target patch, which is the shifted position of the central coordinate position, can be obtained.

The inter-patch correspondence information is also used in step S507. In other words, the patch specification unit 402-B extracts the feature point of the target image data.

Then, the patch specification unit 402-B transmits the patch information of the reference data in the band region that is the processing target, to the parameter calculation unit 402-C.

In step S603a, the parameter calculation unit 402-C acquires the patch information from the patch specification unit 402-B. Then, the parameter calculation unit 402-C refers to the inter-patch correspondence information of the coordinate positions stored in step S602, based on the central coordinate position of the obtained patch information, and thereby obtains the corresponding coordinate position.

Next, the parameter calculation unit 402-C obtains a position adjustment parameter from the central coordinate position of the acquired reference patch and the corresponding coordinate position of the target patch, using the above described method. That is, the parameter calculation unit 402-C obtains a first position adjustment parameter based on the original image in the band region and the feature point of the inspection image.

In step S604a, the position adjustment unit 402-D performs affine transformation on the reference image data of the band region that is a processing target using the obtained affine transformation parameter. Thus, the position adjustment of the reference image data and the target image data is performed.

The down side figure in FIG. 9B illustrates an example of the reference image data subjected to position adjustment by the affine transformation, the broken line rectangle indicates the position of the reference image data before subjected to the affine transformation. In other words, the position adjustment unit 402-D performs a first position adjustment on the images in the band region that is the processing target using the first position adjustment parameter.

In step S605a, the difference image generation unit 402-E compares, the reference image data and the target image data subjected to the position adjustment by the position adjustment unit 402-D to obtain the difference of the reference image data and the target image data, and thereby generates the difference image data. More specifically, the difference image data is generated by setting the pixel data in each coordinate position of the difference image data to be the absolute value of the difference of the image data in each coordinate position of the image data after position adjustment, as expressed by the following equation.

difference image data=|reference image data−target image data|

FIG. 9C illustrates an example of the comparison between the reference image data and the target image data after position adjustment. Both ends of each broken line, which extends from the target image data located on the left side in FIG. 9C to the reference image data after position adjustment located on the right side in FIG. 9C, indicate the correspondence relationship of the coordinate positions of the pixels to be compared between the reference image data and the target image data.

More specifically, FIG. 9C illustrates that, since the reference patch is shifted to the left side, the image of the left side of the dark color characters of the target image data is position-adjusted with high accuracy, however, that the image of the right side of the faint color characters is not position-adjusted with insufficient accuracy. Therefore, in the image region of the right side of the faint color characters, difference between the reference image data and the target image data becomes large.

In step S606a, the determination unit 402-F performs threshold processing on the difference image data generated by the difference image generation unit 402-E and determines that the target image data corresponding to the coordinate position of the pixel having larger difference image data than the threshold as a print defect. In other words, the determination unit 402-F determines whether difference is present between the reference image data and the target image data by performing threshold processing on the difference image data.

FIG. 9D illustrates an example of an error region that is determined to be a print defect as a result of the threshold processing on the difference image data. In FIG. 9D, the image region of the faint color characters where the difference between the reference image data and the target image data becomes large in the comparison in FIG. 9C is determined to be an error region.

In step S607a, the determination result storage unit 402-G stores the error data of the pixel determined by the determination unit 402-F to be a print defect in the storage unit 206.

More specific processing of the above processing is described hereinbelow. First, the determination result storage unit 402-G specifies the coordinate position of the pixel (the error region coordinate position) determined by the determination unit 402-F to be a print defect. Ten, the determination result storage unit 402-G specifies the target image data (error region image data) in the peripheral region (error region) of several pixels×several pixels (for example, 128×128 pixels) including the specified coordinate position.

Then, the determination result storage unit 402-G stores the specified error region coordinate position and the error region image data as data of the error region (i.e., error data) in the storage unit 206. For the size of the peripheral region that can be designated as the error region, another fixed value or a value set by a user instruction via the UI unit 105 may be used. The detailed processing of the inspection processing for each band region performed in step S503 has been described above.

The processing in step S506 is described in detail referring to FIGS. 11A and 11B. The processing in this step is determination processing for determining whether an error region is a region to be subjected to the re-position-adjustment and the re-inspection processing, and performed by the adjacent patch selection unit 402-H. Further, the processing is performed for each error region.

First, the adjacent patch selection unit 402-H acquires error data of the error region (i.e., processing target) and reference data from the storage unit 206. Subsequently, the adjacent patch selection unit 402-H acquires coordinate position of the reference image data corresponding to the acquired error data. The coordinate position is called a reference error region coordinate position.

Subsequently, the adjacent patch selection unit 402-H determines whether the central coordinate position of the reference patch is included in a range from the reference error region coordinate position of the error data to a predetermined distance. In other words, the adjacent patch selection unit 402-H determines whether the reference patch is present in a region adjacent to the error region.

In addition, "the central coordinate position of the reference patch is included in a range from the reference error region coordinate position to a predetermined distance" means that the reference patch is present in a region adjacent to the error region. Then, "the central coordinate position of the reference patch is not included in a range from the error region coordinate position of the error data to a predetermined distance" means that the reference patch is not present in a region adjacent to the error region.

Through this processing, it can be known that the reason why the error region is detected is related to the position adjustment accuracy of the target image data and the reference image data in the error region.

In other words, in a case where the reference patch is present in a region adjacent to the error region, it is supposed that the accuracy of the position adjustment between the reference image data and the target image data is not bad, and the detection reason of the error region is not caused by the accuracy of the position adjustment. Otherwise, the detected error region may not be detected if the accuracy of the position adjustment of the reference image data and the target image data in the error region is improved.

Therefore, in a case where the reference patch is present in a region adjacent to the error region, the adjacent patch selection unit 402-H determines that the error region is a region where no re-position-adjustment is to be performed (NO in step S506), and the processing proceeds to step S508. On the other hand, in a case where the reference patch is not present in a region adjacent to the error region, the adjacent patch selection unit 402-H determines that the error region is a region where re-position-adjustment is to be performed (YES in step S506), the processing proceeds to step S507.

The processing performed by the adjacent patch selection unit 402-H in a case where the processing proceeds to step S507 is described.

The adjacent patch selection unit 402-H transmits the patch information of the reference data in a current band region including the reference error region coordinate position and the band region adjacent to the current band region to the parameter calculation unit 402-C as patch information to be used for the re-position-adjustment in the error region.

More specifically, in the present exemplary embodiment, the adjacent patch selection unit 402-H selects and transmits the patch information of the reference data positioned within a predetermined distance from the reference error region coordinate position among the pieces of patch information in the current and adjacent band region.

Referring to FIGS. 11A and 11B, the description thereof is given. With respect to the error region illustrated in FIG. 11A, the adjacent patch selection unit 402-H determines whether the central coordinate position of the reference patch is included in an adjacent band region and a circle around the error region coordinate position, as illustrated in FIG. 11B.

It can be seen that, in FIG. 11B, central coordinate positions of three reference patches are included. Therefore, it is determined that the reference patch is present in a region adjacent to the error region. Then, the adjacent patch selection unit 402-H transmits the patch information of the three reference patches to the parameter calculation unit 402-C.

Figure 12:
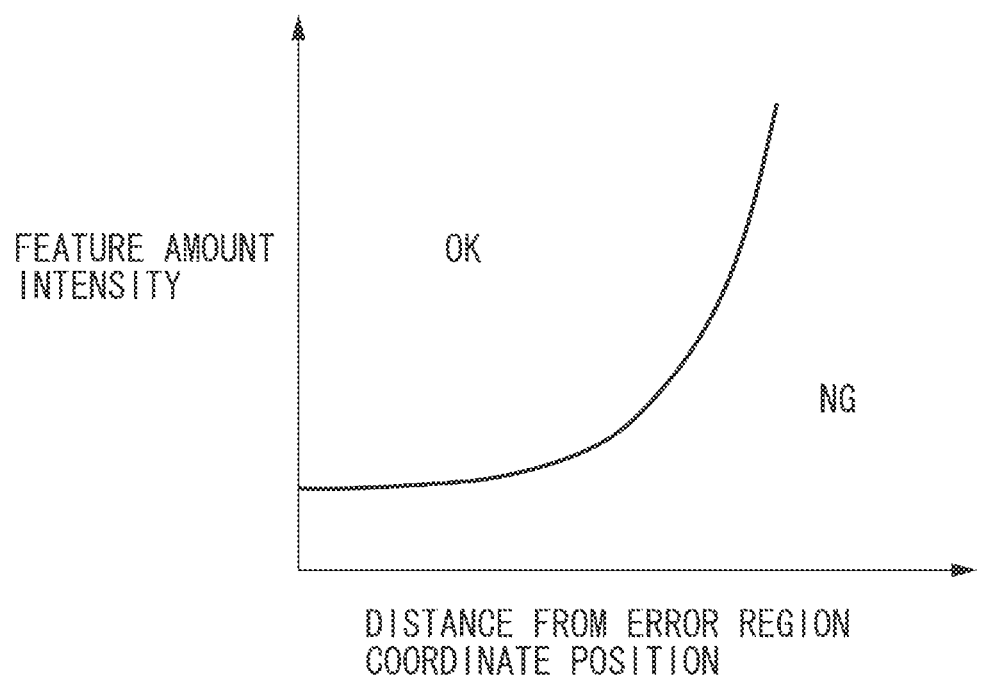
FIG. 12 is a graph illustrating an example of a selection reference for selecting an adjacent patch.

In addition, the selection method for selecting the patch information to be transmitted may be, for example, a method by selecting patch information based on the conditions illustrated in FIG. 12, in addition to the method described above referring to FIGS. 11A and 11B.

More specifically, the adjacent patch selection unit 402-H determines which region the patch information belongs to in the graph in FIG. 12, based on the patch information (intensity of the feature amount and the central coordinate position) and the error region coordinate position. Then, the adjacent patch selection unit 402-H selects the patch information to be used for the re-inspection processing in a case where the patch information belongs to the OK region. On the other hand, the adjacent patch selection unit 402-H does not select the patch information in a case where the patch information belongs to the NG region.

In this way, by performing weighting of the selection with respect to the intensity of the feature amount of the reference patch and the distance, the accuracy of the patches to be used for the position adjustment of the error region can be increased.

The weighting of the selection is performed because even though patch information is closer to the error region but if the intensity of the feature amount is low, the edge (feature point) may not be sharp. Therefore, it may not be useful patch information for the position adjustment.

Further, even though the intensity of the feature amount of the patch information is high, but if the distance from the error region coordinate position is far, the patch information (especially, the central coordinate position) may be affected by a geometric deformation that is different from that adjacent to the error region. Therefore, the patch information may not be useful for the position adjustment. The detailed processing performed in step S506 has been described above.

Figure 6B:
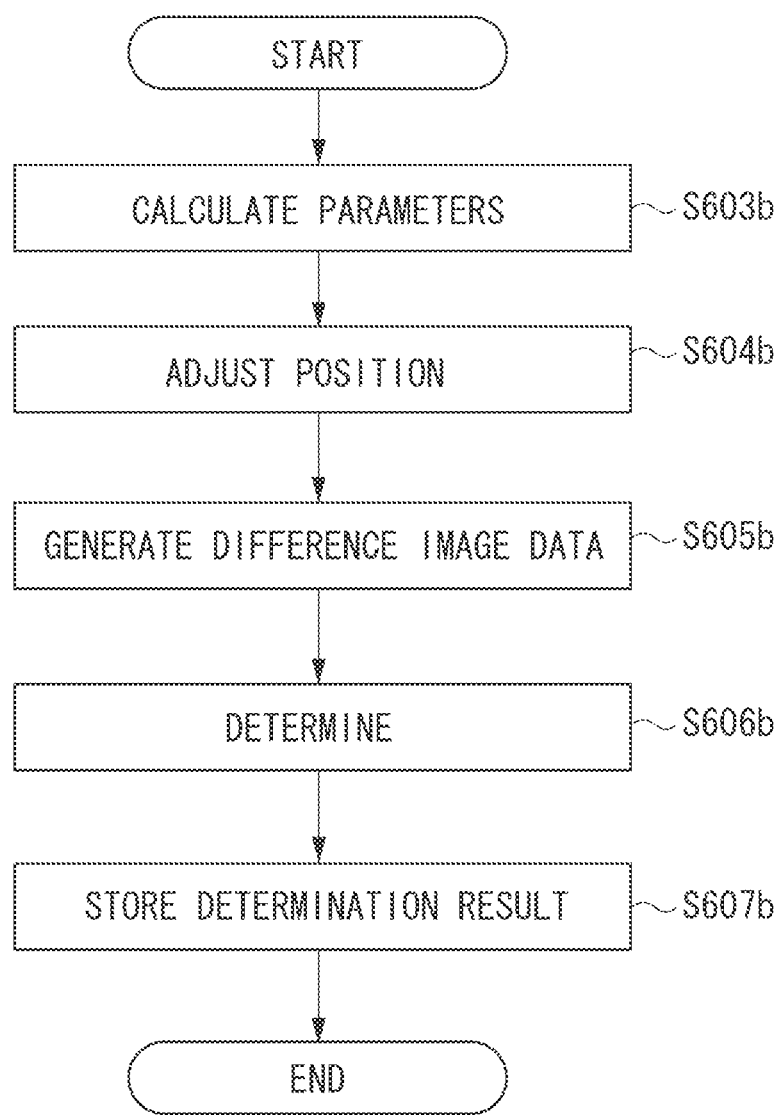

The processing performed in step S507 is described in detail referring to FIG. 6B. FIG. 6B is a flowchart illustrating processing performed in step S507. The flowchart illustrates re-inspection processing in which re-position-adjustment is performed and the detection of the print defect is performed again about the error region.

In step S603b, the parameter calculation unit 402-C specifies reference image data in the band region including the error region coordinate position. Further, the parameter calculation unit 402-C obtains the patch information transmitted by the adjacent patch selection unit 402-H in step S506.

Then, the parameter calculation unit 402-C obtains the central coordinate position of the reference patch from the obtained patch information (1) and (2), and then obtains the corresponding coordinate position of the target patch having correspondence relationship with the central coordinate position.

To obtain the corresponding coordinate position of target patch, the information of the correspondence relationship between the central coordinate position of the reference patch and the corresponding coordinate position of the target patch stored in step s602 by the patch specification unit 402-B in the storage unit 206.

That is, the parameter calculation unit 402-C searches the information of the correspondence relationship for the central coordinate position of the reference patch to obtain the corresponding coordinate position of the corresponding target patch.

The parameter calculation unit 402-C obtains affine transformation parameters a, b, c, d, e, and f by a similar way performed in step S503 after obtaining the central coordinate position of the reference patch and the corresponding coordinate position of the target patch.

Thus obtained affine transformation parameters are parameters in which the patch information of the reference patch adjacent to the error region is taken into consideration. The affine transformation parameters can be referred to as second position adjustment parameters.

In step S604b, the position adjustment unit 402-D performs affine transformation on the reference image data in the band region specified by the parameter calculation unit 402-C, using the obtained affine transformation parameters.

Through the processing, error region image data and the reference image data are position adjusted (second position adjustment) by using the patch information of other than the band region (i.e., adjacent band region) to which the error region belongs. As a result, the accuracy of the position adjustment is higher than that of the position adjustment performed in step S503, because the patch information of the region adjacent to the error region is used.

In step S605b, the difference image generation unit 402-E generates difference image data between the reference image data and the error region image data subjected to the re-position-adjustment regarding the error region. The difference image data is generated in a similar way to that in step S605a.

In step S606b, the determination unit 402-F determines a print defect using the difference image data of the error region, in a similar way to step S606a.

In step S607b, the determination result storage unit 402-G stores the error data in the storage unit 206, in a similar way to step S607a.

The details of the re-inspection processing performed in step S507 has been described above.

Referring to FIGS. 13A, 13B, 13C, and 13D, the advantageous effect of the present exemplary embodiment is described.

FIG. 13A is an example of the target image data including the error region detected by the inspection processing in step S503. That is the same image data as that in FIG. 9D.

The upper figure in FIG. 13B is a diagram illustrating the reference patch included in the adjacent band region selected by the processing in step S506. Further, the lower figure in FIG. 13B illustrates a state where re-position-adjustment is performed by performing affine transformation on the error region in the reference image data using the reference patch illustrated in the upper figure in FIG. 13B. In FIG. 13B, the broken line rectangle indicates the position of the reference image data before subjected to the affine transformation.

Figure 13C:
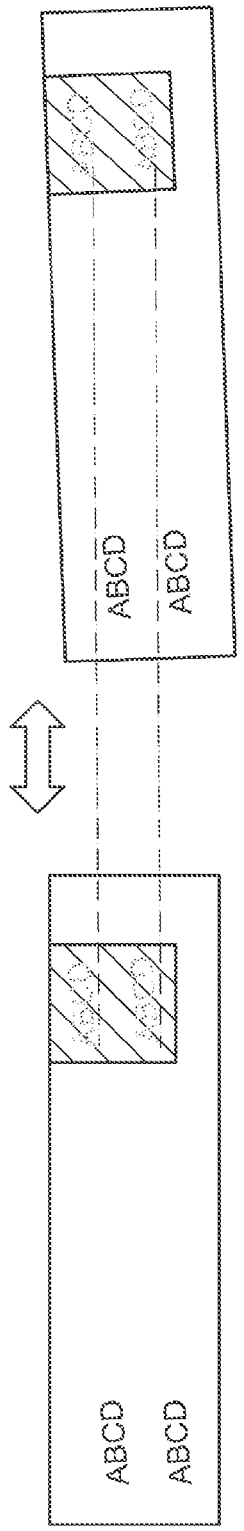

FIG. 13C is a diagram illustrating a comparison between the error region in the reference image data after subjected to the re-position-adjustment illustrated in FIG. 13B, and the error region in the target image data illustrated in FIG. 13A. Both ends of each broken line, which extends from the target image data located on the left side in FIG. 13C to the reference image data after re-position-adjustment located on the right side in FIG. 13C, indicate the correspondence relationship of the coordinate positions of the pixels to be compared between both image data.

More specifically, FIG. 13C illustrates that the image of the right side of the faint color characters are position-adjusted with high accuracy. This is because the reference patches used for the re-position-adjustment are respectively in the adjacent band region adjacent to the error region.

Figure 13D:
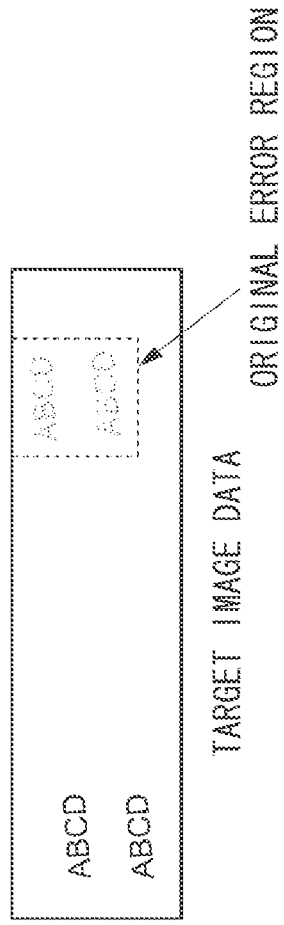

Accordingly, in the comparison between the position-adjusted image data in FIG. 13C, error region detection due to poor position adjustment does not occur. FIG. 13D illustrates that, in the processing in step S503, the region that was detected as an error region is not detected as an error region by the re-inspection processing.

Therefore, according to the present exemplary embodiment, by performing re-inspection processing accompanied with the re-position-adjustment on the error region, using additionally the patch information adjacent to the error region, the error region, which is detected due to poor position accuracy, can be reduced. Therefore, when inspection processing is performed for each band region and features suitable for the position adjustment are few in the band region, the deterioration of the inspection processing accuracy can be restrained.

In the first exemplary embodiment, the inspection processing unit 402 performs the processing in step S505, and if an error region is present, the re-inspection processing is performed on the error region. However, it may be determined that the re-inspection processing is to be performed after the cause of the error region is specified.

For example, as illustrated in the difference image data in FIG. 14, if the area of the print defect pixels (corresponding to the area of the white portion) is larger than a predetermined area, the inspection processing unit 402 determines that the error region is detected due to the cause other than the accuracy of the position adjustment, and re-inspection processing is not performed. On the other hand, if the area of the print defect pixels is smaller than the predetermined area, the inspection processing unit 402 performs re-inspection processing on the detected error region.

As the present modification example, by determining whether the re-inspection processing is to be performed according to the area of the print defect pixels, the calculation amount required for complicated processing such as a calculation of the position adjustment parameters needed to perform the re-inspection processing, can be reduced.

In the first exemplary embodiment, the inspection processing unit 402 performs the processing in step S506, and by determining whether the reference patch is present in a region adjacent to the error region, and determines whether to perform re-inspection processing. However, the present invention is not limited thereto, and whether to perform re-inspection processing on the error region may be determined based on the error region coordinate position in the band region.

Figure 15:
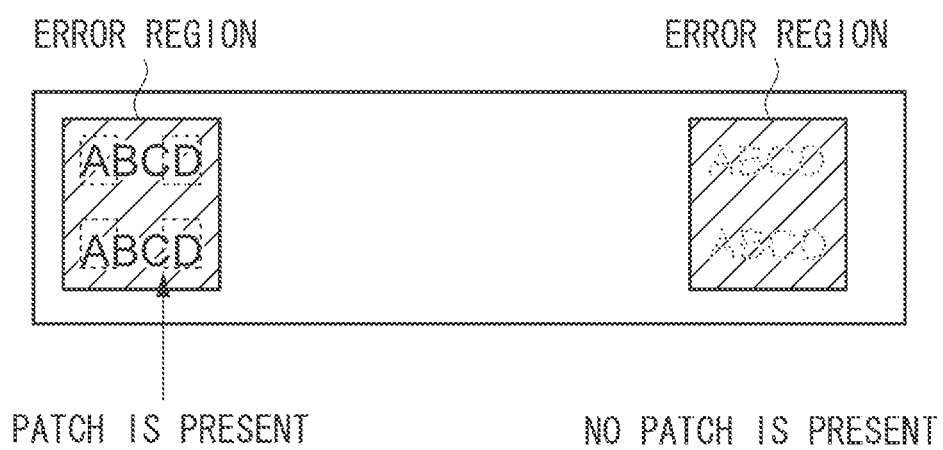
FIG. 15 is a diagram illustrating an example error region.

For example, as illustrated in FIG. 15, in one band region, if a plurality of error regions is present and at least one of the plurality of error regions is detected in a position where the reference patch is extracted, the inspection processing unit 402 does not perform the re-inspection processing. This is because, since the error region is detected in a position where accuracy of the position adjustment is relatively high, such an error region will be detected again as an error region even if the re-inspection processing is performed. Otherwise, the inspection processing unit 402 performs the re-inspection processing.

As the present modification example, by determining whether the re-inspection processing is performed based on the positional relationship between the detection position of the error region in the band region and the reference patch, the calculation amount required for complicated processing such as a calculation of the position adjustment parameters needed to perform the re-inspection processing, can be reduced.

In the first exemplary embodiment, the inspection processing unit 402 performs the processing in step S506, and by determining whether the reference patch is present in a region adjacent to the error region, and determines whether to perform the re-inspection processing. However, whether to perform the re-inspection processing may be determined according to the types of the sheet (paper type) of the printed document.

Figure 16:
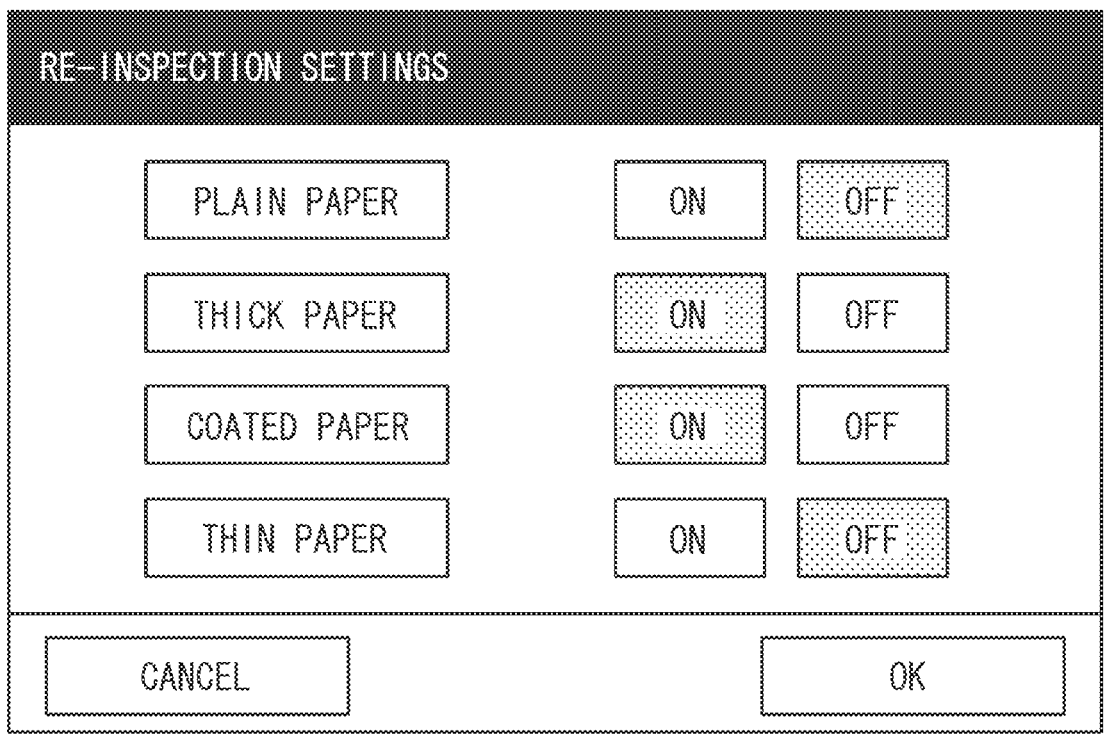
FIG. 16 is a diagram illustrating a setting screen for setting execution of re-inspection processing according to a paper type.

FIG. 16 illustrates a setting screen displayed on the UI unit 105. For example, as illustrated in FIG. 16, according to the paper type, ON/OFF of the re-inspection processing can be set. The re-inspection processing can be executed only for the printed document of the paper type designated by the user.

According to the present modification example, re-inspection processing is performed only for the printed document of the paper type designated by the user. Therefore, by setting the re-inspection processing for the normal paper to be OFF, for example, it is possible not to perform exactly the inspection processing on the printed document of the plain paper used for printing the content generally not so important.

On the other hand, for example, by setting the re-inspection processing for thick paper to be ON, the inspection processing can be performed exactly on the thick paper, because thick paper is often used as a cover whose printed image tends to be viewed by many people. In this way, by setting ON/OFF of the re-inspection processing according to the paper type, inspection accuracy can be changed according to the importance of the paper.

In the first exemplary embodiment, the inspection processing unit 402 performs the processing in step S506, and by determining whether the reference patch is present in a region adjacent to the error region, the re-inspection processing is determined whether to be performed or not. However, it may be determined whether the re-inspection processing is performed according to the process speed (i.e., the image formation speed performed by the printer unit 102).

The printer unit 102 changes, in order to increase the image fixability to a sheet (such as paper), which is an image forming target, the process speed according to the paper type to prevent toner from peeling off from the paper surface, and from remaining on the fixing belt. For example, since the process speed of the thick paper is slower than that of the plain paper, the re-inspection processing for the thick paper can be longer.

Figure 17:
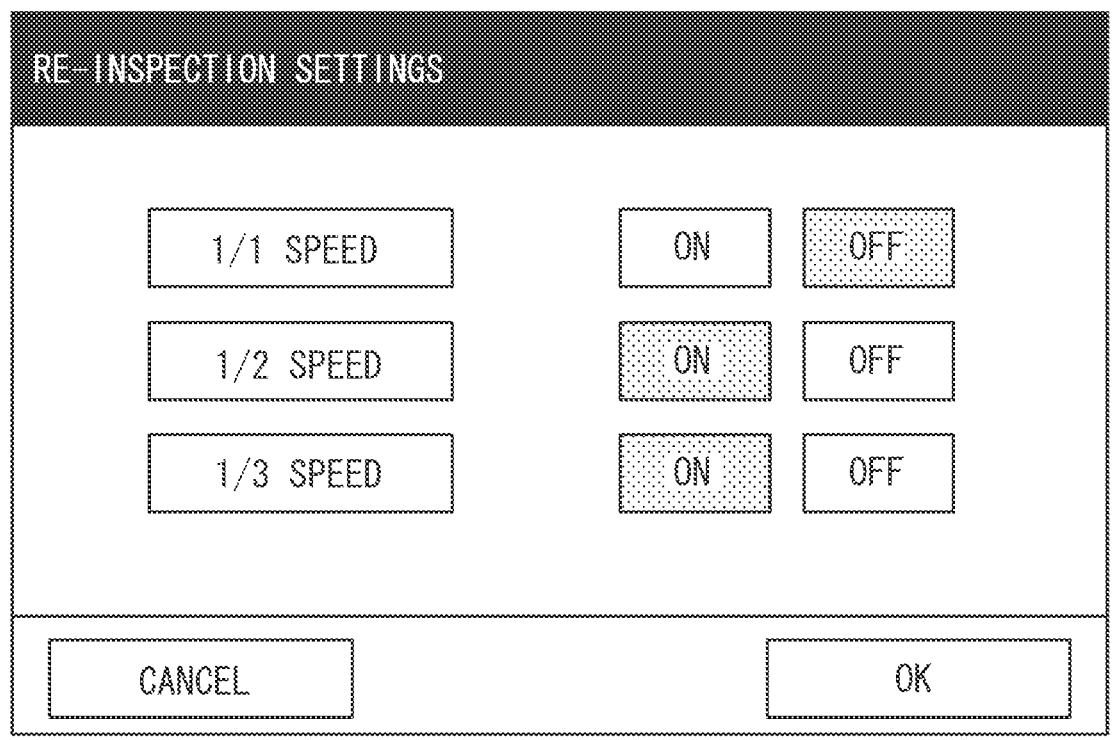
FIG. 17 is a diagram illustrating a setting screen for setting execution of re-inspection processing according to a process speed.

FIG. 17 illustrates a setting screen displayed on the UI unit 105. As illustrated in FIG. 17, ON/OFF setting of the re-inspection processing can be performed according to the process speed, and only when image formation is performed at a process speed designated by the user, the re-inspection processing can be performed. In this way, the inspection processing suitable for the image forming process of the printer unit becomes possible.

Further, the inspection processing unit 402 does not perform re-inspection processing, when the process speed is a normal speed (constant speed), but may perform re-inspection processing when the process speed is faster than the normal speed (½ speed or ⅓ speed).

In the first exemplary embodiment, after inspection processing for all the band regions is completed (i.e., after determining "NO" in step S504), re-inspection processing is performed. In the present exemplary embodiment, with respect to the band region of the processing target, inspection processing in step S503 and re-inspection processing in step S507 are performed in sequence.

Figure 5B:
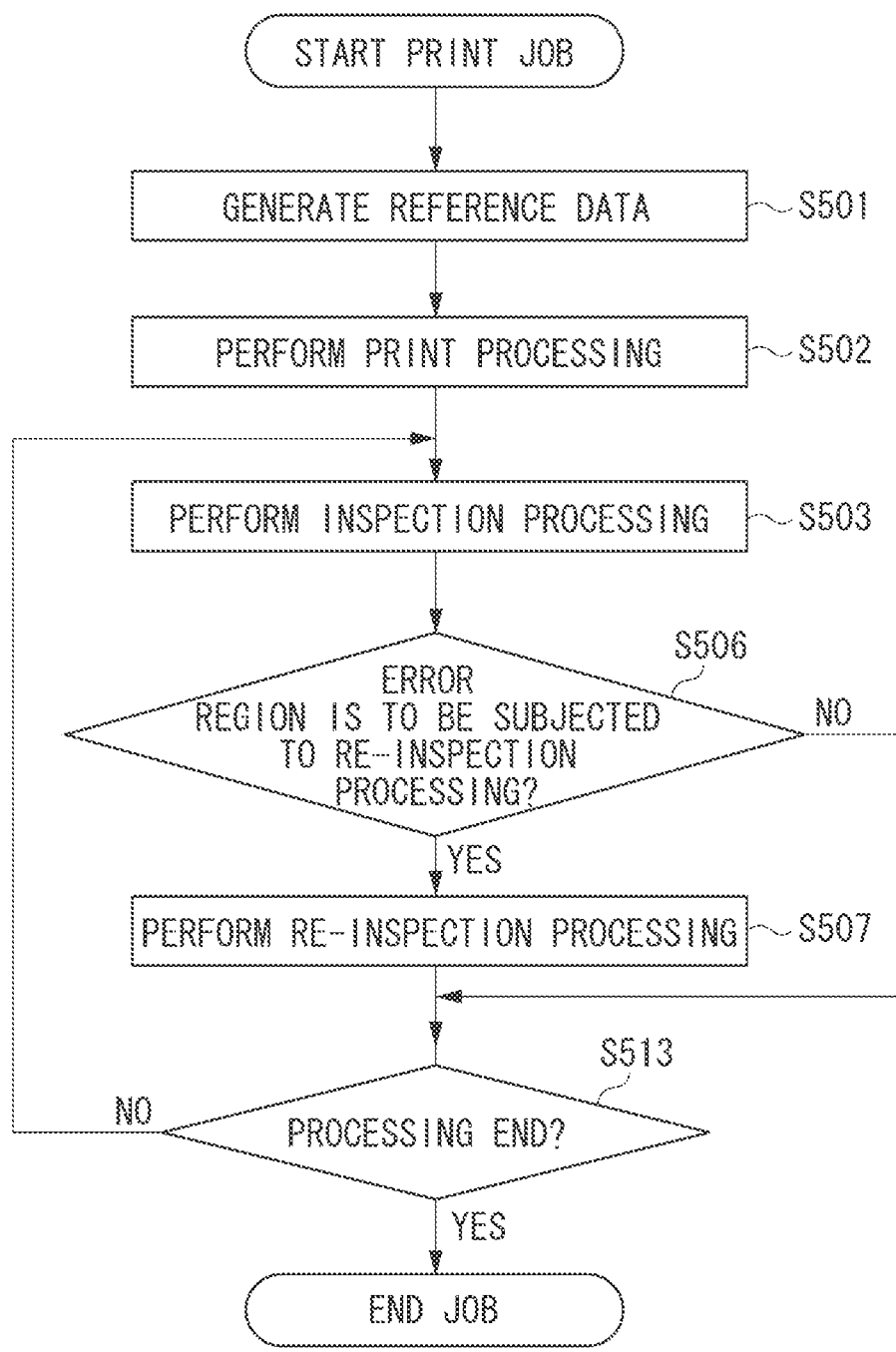

The configuration is described referring to FIG. 5B. Meanwhile, steps with same numerals as those in FIG. 5A, the same processing as that in FIG. 5A is performed. Further, the configuration of the present exemplary embodiment, if not otherwise specified, is similar to that of the first exemplary embodiment, and therefore, the descriptions thereof are omitted.

First, the processing in steps S501 and S502 is performed. Next, in step S503, inspection processing of the band region is performed. Then, the inter-patch correspondence information is stored in the storage unit 206.

Then, in step S506, it is determined whether the error region detected by the inspection processing performed in step S503 is a region on which the re-inspection processing is to be performed. If it is determined the re-inspection processing is to be performed (YES in step S506), the processing proceeds to step S507. Otherwise (NO in step S506), the processing proceeds to step S513.

In step S507, on the error region that is determined in step S506 to be subjected to re-inspection processing, re-inspection processing is performed using the inter-patch correspondence information stored in the storage unit 206.

In this case, the first band region has no band region that was a processing target immediately before the first band region. Therefore, when inspection processing is performed on the error region of the first band region, re-inspection processing may be performed when the inter-patch correspondence information of the band regions after the second band region is stored in the storage unit 206.

In step S513, the CPU 203 determines whether to terminate the inspection processing/re-inspection processing of the printed document. The details of the processing performed in step S513 are described.

First, the CPU 203 determines whether the error data, which is the result of the re-inspection processing in step S507, is stored in the storage unit 206, and the band region that is a processing target is the last band region.

As a result thereof, if the error data is not stored in the storage unit 206, and the band region that is a processing target is the last band region, the CPU 203 determines that the printed document has no print defect (YES in step S513), and the processing is terminated. Further, the CPU 203 controls the finisher unit 104 to discharge the printed document to the output tray the finisher unit 104.

Further, if the error data is stored in the storage unit 206, the CPU 203 determines that the printed document has a print defect (YES in step S513), and the processing is ended regardless of whether all the band regions are processed. Further, the CPU 203 controls the finisher unit 104 to discharge the printed document to the escape tray of the finisher unit 104. In this case, the CPU 203 may control the printer unit 102 to cancel the subsequent print processing and to display on the UI unit 105 the error region coordinate position of the error data stored in the storage unit 206 and the error region image.

On the other hand, the processing target band region is not the last band region, nor the error data is stored in the storage unit 206 (NO in step S513), the CPU 203 advances the processing to step S503 to continue the inspection processing/re-inspection processing. Hereinabove, the processing in step S513 has been described in detail.

In this way, the inspection processing and the re-inspection processing are sequentially performed, and based on the result thereof, the continuation and termination of the processing is determined. As a result, at a time when it is determined that the print defect is present, the processing can be stopped. Therefore, the processing time taken for the inspection processing/re-inspection processing can be reduced.

In the first exemplary embodiment, the inspection processing unit 402 performs re-inspection processing on the error region after performing re-position-adjustment further using the reference patch of the adjacent band region. Thus, the issue that the deterioration of the position adjustment accuracy when the inspection processing is performed for each band region is solved.

In a third exemplary embodiment, the configuration in which inspection processing for each band region is performed without performing re-inspection processing. More specifically, according to the present exemplary embodiment, by expanding the band region in advance based on the patch information of the reference data, at the time of the inspection processing of the band region, the patch information included in the band region is prevented from being insufficient. Thereby, even when the inspection processing is performed for each band region, position adjustment accuracy is prevented from being deteriorated.

Hereinbelow, the band division unit 401-E according to the present exemplary embodiment is described. However, configurations of other portions are similar to those of the first exemplary embodiment, and the descriptions thereof are omitted.

Figure 7:
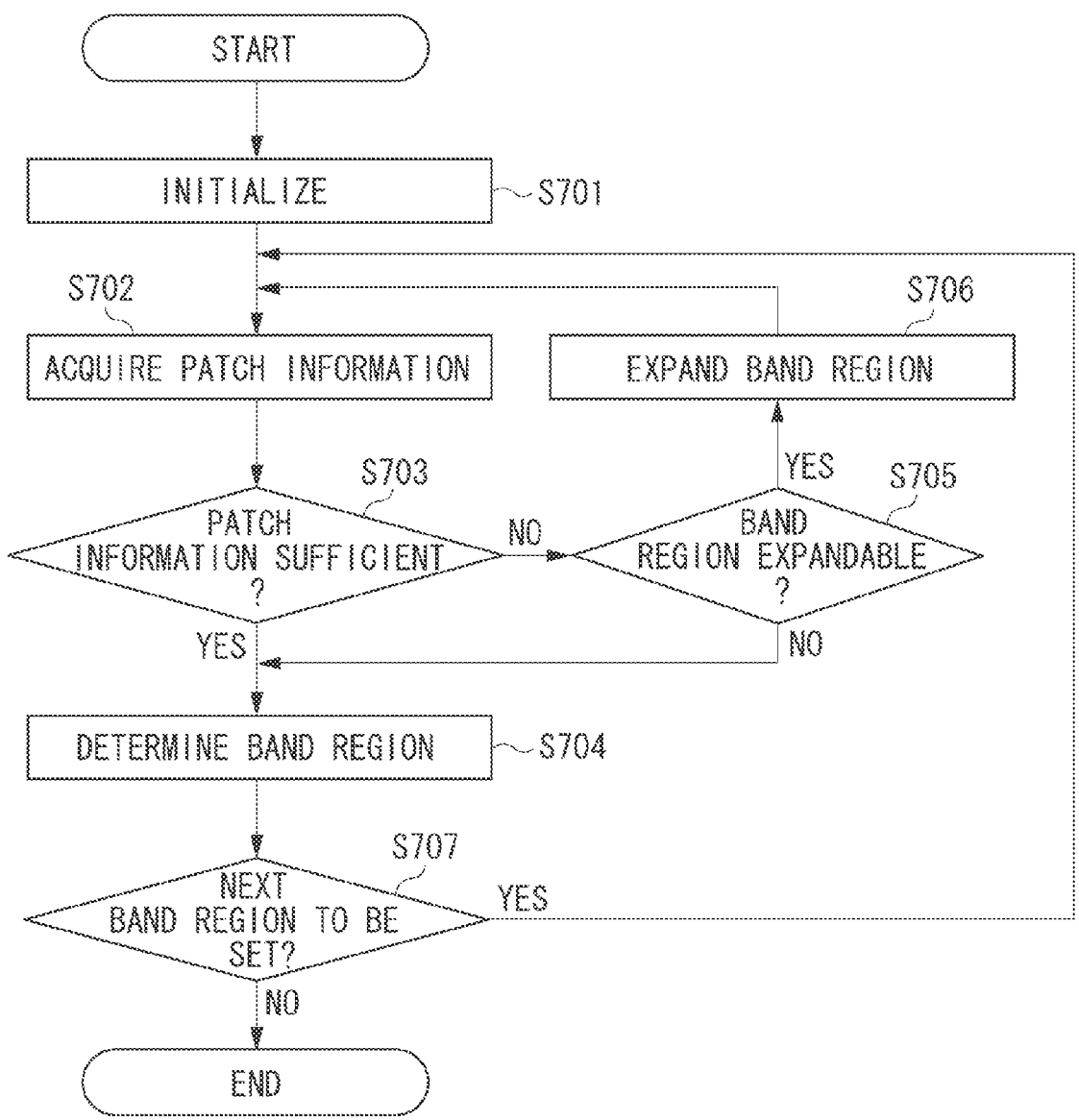
FIG. 7 is a flowchart illustrating a processing flow of a band division unit according to a second exemplary embodiment of the present invention.

FIG. 7 is a flowchart illustrating a processing flow executed by the band division unit 401-E according to the present exemplary embodiment.

In step S701, the band division unit 401-E initializes the variable n, which represents the number of the band regions, to be 1, the reading start position of the n-th band region (i.e., first in this case) is set to the leading position of the reference image data (referred to as initialization).

In step S702, the band division unit 401-E sets the reading end position of the n-th band region to a position where a predetermined band size is added to the reading start position of the n-th band region, if the reading end position of the n-th band region is not set. Then, the band division unit 401-E obtains from the patch extraction unit 401-D the patch information included in the reference image data from the reading start position to the reading end position.

In step S703, the band division unit 401-E calculates the number of the reference patches and the distribution thereof from the patch information obtained in step S702. Then, the band division unit 401-E determines (evaluates) whether the calculated number of the reference patch and the distribution (i.e., information of the feature point of the reference image data) satisfy conditions sufficient for using the position adjustment.

That is, the band division unit 401-E determines (evaluates) whether the patch information is sufficient. If it is determined that the patch information is sufficient (YES in step S703), the processing proceeds to step S704. Otherwise (NO in step S703), the processing proceeds to step S705.

Figure 18:
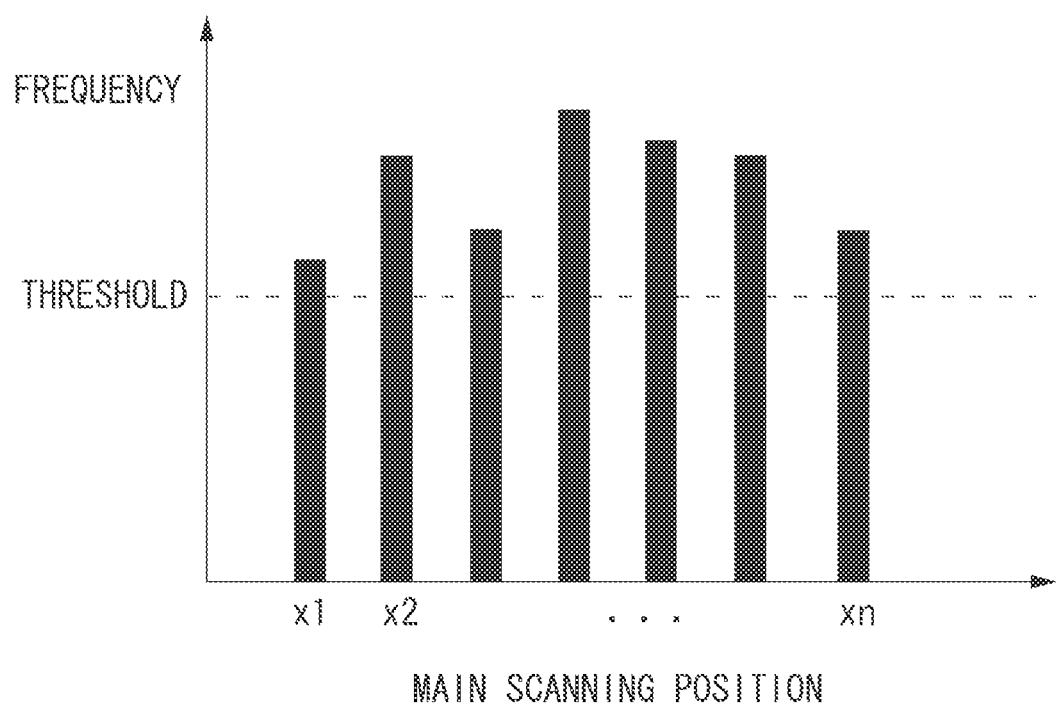
FIG. 18 is a graph illustrating a patch distribution.

FIG. 18 illustrates a condition that is a determination reference in step S703. FIG. 18 is a histogram illustrating a frequency distribution of the reference patches at each main scanning position of the band region. In the present exemplary embodiment, the main scanning position is a position along the longitudinal direction of the band region illustrated in FIG. 8D and FIG. 9 (i.e., x1, x2, . . . , xn). The frequency is the number of the reference patches at each main scanning position.

In step S703, the condition on which the information is determined to be sufficient, the frequency at each main scanning position is larger than a predetermined threshold. Referring to FIG. 18, in a case where the frequencies of d1 to dn respectively corresponding to main scanning positions x1 to xn satisfy the following condition, the patch information is determined to be sufficient.

$d1>$threshold, and $d2>$threshold, . . . , and $dn>$threshold

In step S704, the band division unit 401-E determines the n-th band region. More specifically, the band division unit 401-E stores the reading start position and the reading end position of the n-th band region in the storage unit 206, and sets the reading end position of the n-th band region to the reading start position of the (n+1)-th band region. Then, the band division unit 401-E increments the valuable n by 1, and the processing proceeds to step S707.

In step S705, the band division unit 401-E determines whether the reading end position of the n-th band region can be re-set to a position to which an additional band size is added.

In other words, the band division unit 401-E determines whether the n-th band region can be expanded. If it is determined that n-th band region can be expanded (YES in step S705), the processing proceeds to step S706. Otherwise (NO in step S705), the processing proceeds to step S704.

In the present exemplary embodiment, whether the n-th band region can be expanded is determined based on whether the band size of the n-th band region before expansion exceeds a predetermined maximum value. If the band size of the n-th band region exceeds the predetermined maximum value, it is determined that the n-th band region cannot be expanded. On the other hand, if the band size of the n-th band region does not exceed the predetermined maximum value, it is determined that the n-th band region can be expanded.

In step S706, as illustrated in FIG. 19, the band division unit 401-E re-sets the reading end position of the n-th band region to a position to which the additional band size is added, and the processing proceeds to step S702.

In step S707, the band division unit 401-E determines whether to set the next band region by determining whether the reading start position of the n-th band region is behind the end position of the reference image data. If it is determined that the next band region is set (YES in step S707), the processing proceeds to step S702. Otherwise (NO in step S707) the, processing is terminated.

The reading start position and the reading end position of each band region set through the series of processing is stored in the storage unit 206 as the reference data. Then, the reading start positions and reading end positions stored in the storage unit 206 is used for the inspection processing performed by the inspection processing unit 402.

According to the present exemplary embodiment, by expanding the band region dynamically, even when the inspection processing is performed for each band region, the deterioration of the position adjustment accuracy can be restrained.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-272164 filed Dec. 13, 2011, which is hereby incorporated by reference herein in its entirety.

What is claimed is:

1. An inspection apparatus configured to perform position adjustment between a reference image and a target image of a printed document to inspect the printed document, the inspection apparatus comprising:

an extraction unit configured to extract a feature point of each of the reference image and the target image used for the position adjustment;

an acquisition unit configured to acquire an image in a band region of a predetermined size from each of the reference image and the target image;

a position adjustment unit configured to perform a first position adjustment on the reference image and the target image in the band region, using each feature point in the band region extracted by the extraction unit;

a first determination unit configured to compare the reference image and the target image after the first position adjustment and determine whether there is a difference between the reference image and the target image after the first position adjustment; and a second determination unit configured to determine whether there is a feature point for the first position adjustment in a region adjacent to the band region, in a case where the first determination unit determines that there is a difference between the reference image and the target image in the band region after the first position adjustment, wherein in a case where the second determination unit determines that there is no feature point for the first position adjustment in the region adjacent to the band region, the position adjustment unit performs a second position adjustment of the reference image and the target image after the first position adjustment using a feature point for the first position adjustment in the band region and additional patch information in the region adjacent to the band region, and wherein the determination unit determines whether there is a difference between the reference image and the target image after the second position adjustment, and wherein in a case where the second determination unit determines that there is a feature point for the first position adjustment in the region adjacent to the band region, the position adjustment unit does not perform the second position adjustment.

2. The inspection apparatus according to claim 1, further comprising:

a reference patch extraction unit configured to extract a reference patch from the reference image based on a size of a feature amount of the feature point extracted from the reference image; and a specification unit configured to specify a target patch corresponding to the reference patch from the target image, wherein the position adjustment unit compares the reference patch and the target patch to obtain a shift amount between the reference patch and the target patch to perform the position adjustment based on the obtained shift amount.

3. An inspection method for performing position adjustment between a reference image and a target image of a printed document and performing inspection of the printed document, the method comprising:

extracting a feature point of each of the reference image and the target image for the position adjustment;

acquiring an image in a band region of a predetermined size from each of the reference image and the target image;

performing a first position adjustment using each feature point in the extracted band region on the reference image and the target image in the band region; and performing a first determination for comparing the reference image and the target image after the first position adjustment to determine whether there is a difference between the reference image and the target image after the first position adjustment, wherein in a case where it is determined by the first determining that there is a difference between the reference image and the target image in the band region after the first position adjustment, the method further comprises;

performing a second determination for determining whether there is a feature point for the first position adjustment in a region adjacent to the band region;

performing a second position adjustment of the reference image and the target image after the first position adjustment, in a case where it is determined by the second determining that there is no feature point for the first position adjustment in the region adjacent to the band region, using a feature point for the first position adjustment in the band region and additional patch information in the region adjacent to the band region; and performing a third determination for determining whether there is a difference between the reference image and the target image after the second position adjustment, wherein in a case where it is determined by the second determining that there is a feature point for the first position adjustment in the region adjacent to the band region, the second position adjustment is not performed.

4. The inspection method according to claim 3, further comprising:

extracting a reference patch from the reference image based on a size of a feature amount of the feature point extracted from the reference image;

specifying a target patch corresponding to the reference patch from the target image; and comparing the reference patch and the target patch to obtain a shift amount between the reference patch and the target patch to perform the position adjustment based on the obtained shift amount, in performing the position adjustment.

5. A non-statutory computer-readable storage medium for storing a program to cause a computer to perform position adjustment of a reference image and a target image of a printed document to perform inspection of the printed document, the method comprising:

extracting a feature point of each of the reference image and the target image for the position adjustment;

acquiring an image in a band region of a predetermined size from each of the reference image and the target image;

performing a first position adjustment using each feature point in the extracted band region on the reference image and the target image in the band region; and performing a first determination for comparing the reference image and the target image after the first position adjustment to determine whether there is a difference between the reference image and the target image after the first position adjustment, wherein in a case where it is determined by the first determining that there is a difference between the reference image and the target image in the band region after the first position adjustment, the method further comprises;

performing a second determination for determining whether there is a feature point for the first position adjustment in a region adjacent to the band region;

performing a second position adjustment of the reference image and the target image after the first position adjustment, in a case where it is determined by the second determining that there is no feature point for the first position adjustment in the region adjacent to the band region, using a feature point for the first position adjustment in the band region and additional patch information in the region adjacent to the band region; and performing a third determination for determining whether there is a difference between the reference image and the target image after the second position adjustment, wherein in a case where it is determined by the second determining that there is a feature point for the first position adjustment in the region adjacent to the band region, the second position adjustment is not performed.

* * * * *